(12) United States Patent
Tamura

(10) Patent No.: US 8,373,766 B2
(45) Date of Patent: Feb. 12, 2013

(54) IMAGE SHOOTING DEVICE AND IMAGE SHOOTING METHOD

(75) Inventor: Kazunori Tamura, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 852 days.

(21) Appl. No.: 12/372,267

(22) Filed: Feb. 17, 2009

(65) Prior Publication Data
US 2009/0225182 A1   Sep. 10, 2009

(30) Foreign Application Priority Data
Mar. 6, 2008   (JP) ................................. 2008-056486

(51) Int. Cl.
*H04N 5/228* (2006.01)
*H04N 5/222* (2006.01)
(52) U.S. Cl. ..................... 348/222.1; 348/371
(58) Field of Classification Search ............... 348/208.6, 348/208.12, 208.13, 208.14, 208.16, 370, 348/371
See application file for complete search history.

(56) References Cited

U.S. PATENT DOCUMENTS

| | | | |
|---|---|---|---|
| 2005/0057662 A1* | 3/2005 | Washisu | 348/208.99 |
| 2005/0146619 A1* | 7/2005 | Kobayashi et al. | 348/208.1 |
| 2006/0115297 A1* | 6/2006 | Nakamaru | 399/163 |
| 2008/0106636 A1* | 5/2008 | Wernersson | 348/371 |

FOREIGN PATENT DOCUMENTS
JP   08-313958 A   11/1996

* cited by examiner

*Primary Examiner* — Aung S Moe
(74) *Attorney, Agent, or Firm* — Sughrue Mion, PLLC

(57) ABSTRACT

An image shooting device includes an image shooting component, a brightness detector, a flash component, a shift detector, a controller, and a flash amount determining component. The shift detector detects a shift amount of a subject position in a set of image data that has arisen due to shaking of the image shooting device. The controller corrects, on the basis of the detected shift amount, at least one of two sets of image data acquired within non-flash state and flash-emitting state, such that positions of a detection target region with respect to the subject position of the respective sets of image data are substantially matched. The flash amount determining component determines a flash amount of the flash component on the basis of the detected brightness level.

9 Claims, 25 Drawing Sheets

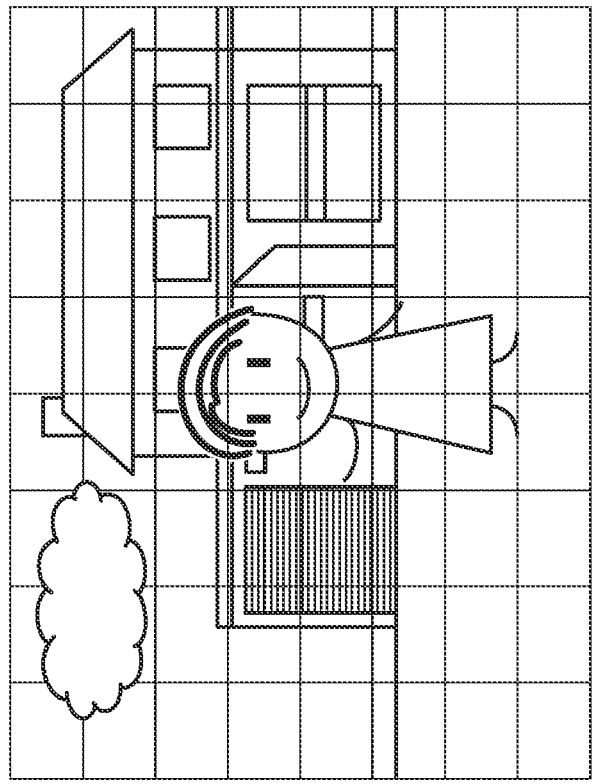
FIG. 11B    WEIGHTING FACTORS
FIG. 11A    CORRESPONDENCE BETWEEN SUBJECT AND DETECTION TARGET REGIONS

DURING NON-FLASH EXPOSURE

DURING FLASH EXPOSURE

FIG. 25

| CAMERA SHAKE CORRECTION | ON |
|---|---|
| UNCORRECTED AMOUNT | (100, −50) |
| NON-FLASH METERING AREA POSITION | (0, 0) |
| FLASH METERING AREA POSITION | (100, −50) |

IMAGE SHOOTING DEVICE AND IMAGE SHOOTING METHOD

CROSS-REFERENCE TO RELATED APPLICATION

This application claims priority under 35 USC 119 from Japanese Patent Application No. 2008-056486, the disclosure of which is incorporated by reference herein.

BACKGROUND OF THE INVENTION

1. Field of the Invention

The present invention relates to an image shooting device and, in particular, to an image shooting device that performs non-flash exposure and pre-flash exposure.

2. Description of the Related Art

Among image shooting devices that perform dimming to adjust the flash amount of a flash when shooting an image with a flash using a solid-state image sensor such as a charge coupled device (CCD) image sensor, an image shooting device that performs non-flash exposure and pre-flash exposure has been proposed.

In such an image shooting device, when a subject that is a target of dimming during non-flash exposure or a subject that is a target of dimming during pre-flash exposure end up shifting (displacing) because of camera shake, the image shooting device is unable to perform dimming correctly.

As a technology relating to camera shake, Japanese Patent Application Laid-Open (JP-A) No. 8-313958 discloses a camera that includes a shake correcting function and that, during shake correction, changes the flash light emission brightness level such that the camera is capable of natural image shooting utilizing ambient light even in light conditions in which the flash ends up flashing.

The aforementioned problem becomes particularly pronounced when a bright subject is included, in conditions such as outside in the middle of the day. However, the technology disclosed in JP-A No. 8-313958 does not solve the above problem resulting from camera shake during dimming.

SUMMARY OF THE INVENTION

In consideration of the above, the present invention provides an image shooting device and image shooting method that performs dimming by non-flash exposure and pre-flash exposure, and that enables accurate dimming even if a subject that is a target of dimming during non-flash exposure or a subject that is a target of dimming during pre-flash exposure shift because of camera shake.

An aspect of the present invention is an image shooting device including: an image shooting component that outputs a set of image data that is obtained by shooting a subject and which represents the subject, the set of image data including target region image data that correspond to a detection target region that includes the subject; a brightness detector that detects a brightness level from the target region image data; a flash component that emits light toward the subject; a shift detector that detects a shift amount, of a subject position in a set of image data, of a shift that has arisen due to shaking of the image shooting device; a controller that, on the basis of the shift amount detected by the shift detector, corrects at least one of two sets of image data including a set of image data acquired in a state in which the flash component is not emitting light or a set of image data acquired in a state in which the flash component is emitting light, such that positions of the detection target region with respect to the subject position of the respective sets of image data are substantially matched; and a flash amount determining component that determines a flash amount of the flash component on the basis of the detected brightness level.

Another aspect of the present invention is image shooting method including: shooting a subject in a state in which a flash component of an image shooting device does not emit light and in a state in which the flash component emits light, to acquire two sets of image data that represent the subject, each set of image data including target region image data that correspond to a detection target region that includes the subject; detecting a shift amount of a subject position between the two sets of image data that has arisen due to shaking of an image shooting device; correcting at least one of the acquired sets of image data, on the basis of the shift amount, such that a position of the detection target region with respect to the subject position of the image data acquired in a state in which the flash component does not emit light and that of the image data acquired in a state in which the flash component emits light, are substantially matched; detecting brightness levels of the respective target region image data; and determining a flash amount of the flash component on the basis of the detected brightness levels.

BRIEF DESCRIPTION OF THE DRAWINGS

Exemplary embodiments of the present invention will be described in detail based on the following figures, wherein:

FIG. 11A is a diagram showing the relationship between a subject and detection target regions, and FIG. 11B is a diagram showing weighting factors that are used when performing weighted averaging using brightness levels obtained in detection target regions;

FIG. 25 is a diagram showing the content and structure of data that are recorded.

DETAILED DESCRIPTION OF THE INVENTION

Exemplary embodiments according to the present invention will be described in detail with reference to the accompanying drawings.

Figure 1:
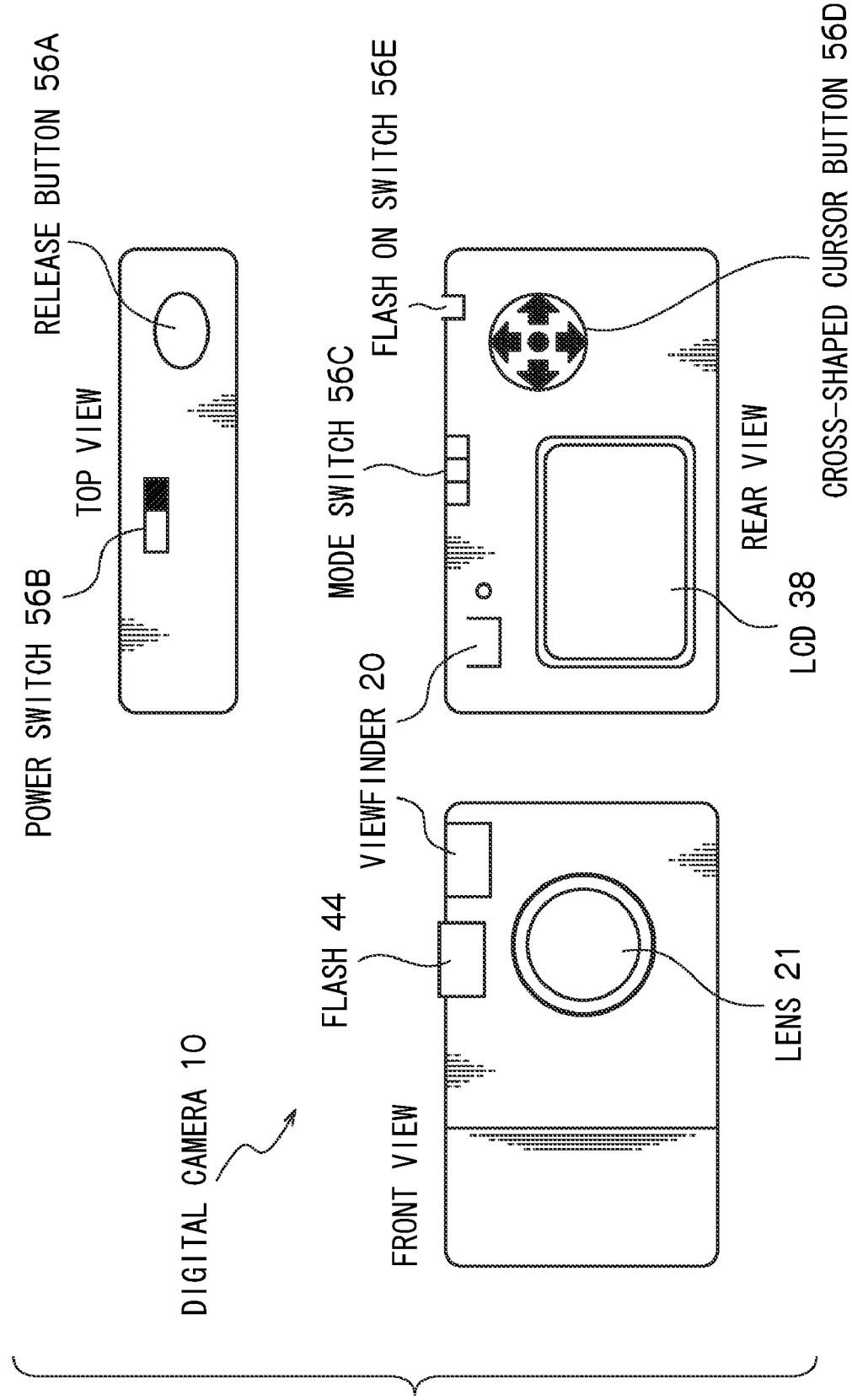
FIG. 1 is a diagram showing the exterior configuration of a digital camera pertaining to the exemplary embodiments.

First, the exterior configuration of a digital camera 10 pertaining to the exemplary embodiments will be described with reference to FIG. 1. On the front surface of the digital camera 10 are disposed a lens 21, a viewfinder 20 and a flash 44. The lens 21 is an optical member for focusing a subject image. The viewfinder 20 is used for determining the composition of a subject to be captured. The flash 44 emits light toward the subject. On the top surface of the digital camera 10 are disposed a release button (shutter) 56A and a power switch 56B. The release button 56A is pressed when executing image capture.

The release button 56A of the digital camera 10 pertaining to the exemplary embodiments is configured to be capable of detecting two stages of pressing: a state where the release button 56A is pressed to an intermediate position (below, a "half-pressed state") and a state where the release button 56A is pressed to a final pressing position beyond the intermediate position (below, a "fully pressed state").

In the digital camera 10, when the release button 56A is pressed to the half-pressed state, the brightness of a subject is metered and, on the basis of the brightness of the subject that has been metered, an automatic exposure (AE) function operates and exposure conditions (shutter speed and aperture) are set. Thereafter, an auto focus (AF) function operates and focusing is controlled, and when the release button 56A is further pressed to the fully pressed state, exposure (image shooting) is performed.

On the back surface of the digital camera 10 are disposed an eyepiece of the aforementioned viewfinder 20, an LCD 38 and a mode switch 56C. The LCD 38 displays subject images that have been captured and menu screens. The mode switch 56C is slid when setting the digital camera 10 to either an image shooting mode that is a mode for performing image shooting or a playback mode that is a mode for playing back and displaying, on the LCD 38, subject images that have been obtained by image shooting.

Further, on the back surface of the digital camera 10 are also disposed a cross-shaped cursor button 56D and a flash ON switch 56E. The flash ON switch 56E is pressed when setting a flash ON mode that is a mode that forcibly causes the flash 44 to emit light during image shooting.

The cross-shaped cursor button 56D is configured to include four arrow keys, which represent four moving directions of up, down, right and left in a display region of the LCD 38, and an enter key that is located in the center of the arrow keys.

Figure 2:
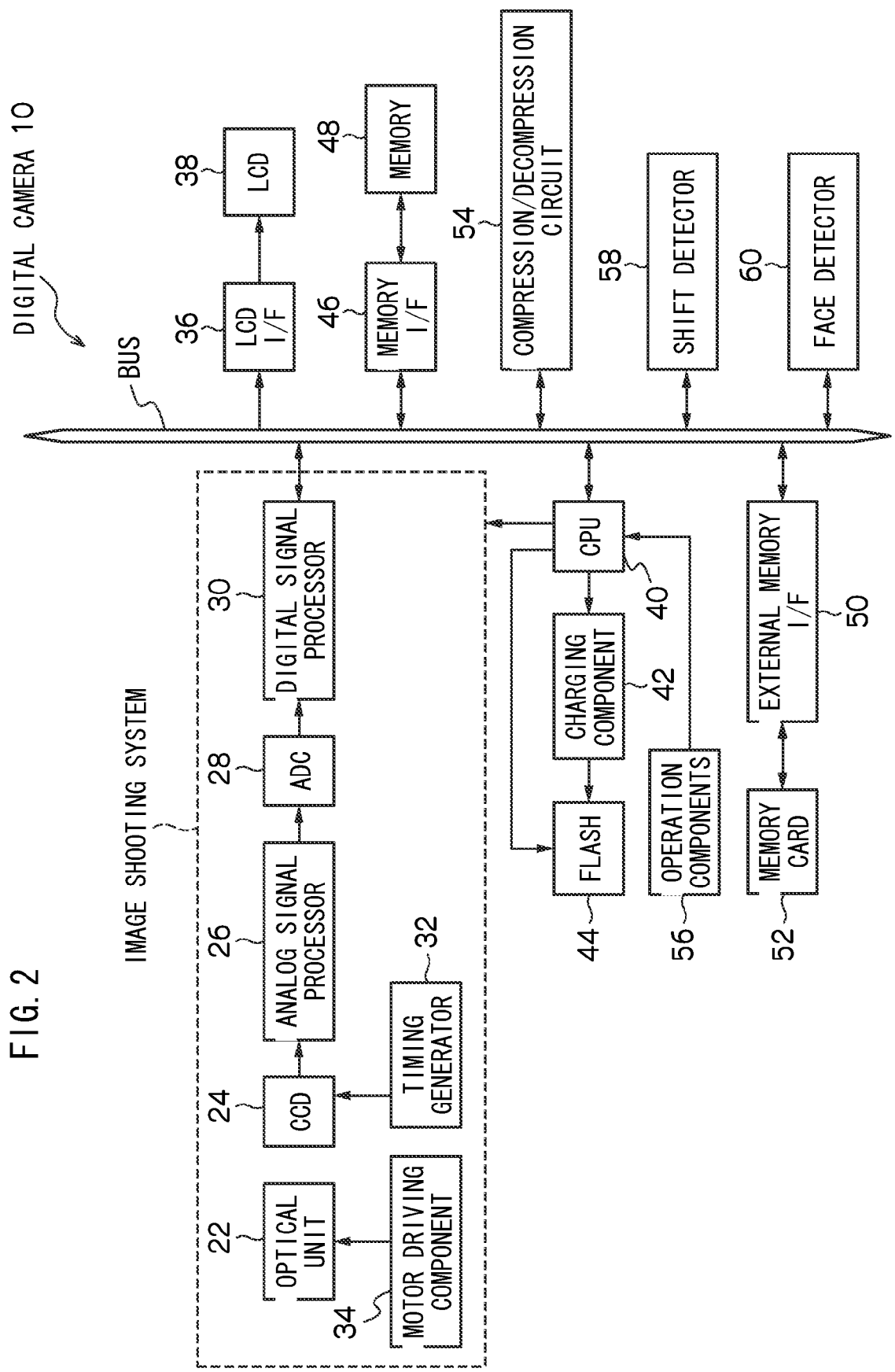
FIG. 2 is a diagram showing the configuration of an electrical system of the digital camera pertaining to the exemplary embodiments.

Next, the configuration of the electrical system of the digital camera 10 pertaining to the exemplary embodiments will be described with reference to FIG. 2.

The digital camera 10 is configured to include an optical unit 22, a charge coupled device (below, called a "CCD") 24 and an analog signal processor 26. The optical unit 22 is configured to include the aforementioned lens 12. The CCD 24 is an imaging element that is disposed at the rear side of an optical axis of the lens 12. The analog signal processor 26 performs various kinds of analog signal processing with respect to analog signals that have been inputted thereto.

Further, the digital camera 10 is configured to include an analog/digital converter (below, called an "ADC") 28 and a digital signal processor 30. The ADC 28 converts the analog signals that have been inputted thereto into digital data. The digital signal processor 30 performs various kinds of digital signal processing with respect to the digital data that have been inputted thereto.

The digital signal processor 30 houses a line buffer of a predetermined capacity and also performs control to cause the digital data that have been inputted thereto to be directly stored in a predetermined region of a memory 48 that is described in the following.

An output terminal of the CCD 24 is connected to an input terminal of the analog signal processor 26, an output terminal of the analog signal processor 26 is connected to an input terminal of the ADC 28, and an output terminal of the ADC 28 is connected to an input terminal of the digital signal processor 30. Consequently, an analog signal that represents a subject image and has been outputted from the CCD 24 is subjected to predetermined analog signal processing by the analog signal processor 26 and is converted into digital image data (image information) by the ADC 28. Thereafter, the digital image data are inputted to the digital signal processor 30. In this manner, the image shooting system outputs digital image data that represent a subject and which are obtained by shooting the subject.

The digital camera 10 is further configured to include an LCD interface 36, a central processing unit (CPU) 40, a memory 48 and a memory interface 46. The LCD interface 36 generates a signal for causing the LCD 38 to display subject images and menu screens and supplies the signals to the LCD 38. The CPU 40 controls operation of the entire digital camera 10. The memory 48 stores the digital image data that have been obtained by image shooting. The memory interface 46 controls access with respect to the memory 48.

Moreover, the digital camera 10 is configured to include an external memory interface 50, a compression/decompression circuit 54, a shift (displacement) detector 58 and a face detector 60. The external memory interface 50 enables a portable memory card 52 to be accessed by the digital camera 10. The compression/decompression circuit 54 performs compression processing and decompression processing with respect to digital image data. The shift detector 58 detects a shift (displacement) amount of a subject represented by digital image data, which shift has arisen because of camera shake. The face detector 60 detects, from digital image data outputted by the image shooting system, a human face included in the subject represented by the digital image data. The shift detector 58 may be configured by hardware such as a gyro sensor or the like or may be configured by software such as a program that extracts characteristic points or detects movement.

In the digital camera 10 of the exemplary embodiments, at least one of a VRAM (Video RAM), SRAM, DRAM or a flash memory is used as the memory 48, and a SmartMedia® memory card is used as the memory card 52. In the exemplary embodiments, various sets of image data are recorded in the memory 48.

The digital signal processor 30, the LCD interface 36, the CPU 40, the memory interface 46, the external memory interface 50 and the compression/decompression circuit 54 are interconnected via a system bus BUS. Consequently, the CPU 40 can control operation of the digital signal processor 30 and operation of the compression/decompression circuit 54, display various kinds of information on the LCD 38 via the LCD interface 36, and access the memory 48 and the memory card 52 via the memory interface 46 and the external memory interface 50, respectively.

The digital camera 10 is also equipped with a timing generator 32 that mainly generates a timing signal for driving the CCD 24 and supplies the timing signal to the CCD 24. The driving of the CCD 24 is controlled by the CPU 40 via the timing generator 32.

Moreover, the digital camera 10 is equipped with a motor driving component 34. The driving of a focal point adjustment motor, a zoom motor and an aperture driving motor, which are disposed in the optical unit 22 but are not shown, is also controlled by the CPU 40 via the motor driving component 34.

That is, the lens 12 pertaining to the exemplary embodiments includes plural lenses, is configured as a zoom lens having adjustable focal distance (capable of magnification), and is equipped with a lens driving mechanism (not shown). The lens driving mechanism includes the focal point adjustment motor, the zoom motor and the aperture driving motor, and these motors are respectively driven by drive signals that have been supplied from the motor driving component 34 as controlled by the CPU 40.

The aforementioned release button 56A, power switch 56B, mode switch 56C, cross-shaped cursor button 56D and flash ON switch 56E (which are collectively called "operation components 56" in FIG. 2) are connected to the CPU 40, and the CPU 40 can always acquire operation states of the operation components 56.

Further, the digital camera 10 is equipped with a charging component 42 that is interposed between the flash 44 and the CPU 40 and charges the flash 44 with electrical power in order to enable the flash 44 to emit light as controlled by the CPU 40. Moreover, the flash 44 is also connected to the CPU 40, and light emission from the flash 44 is controlled by the CPU 40.

Next, overall operation of the digital camera 10 pertaining to the exemplary embodiments during image shooting will be briefly described.

First, the CCD 24 performs image shooting via the optical unit 22 and sequentially outputs analog signals of each of red (R), green (G) and blue (B) that represent a subject image to the analog signal processor 26. The analog signal processor 26 administers analog signal processing such as correlated double sampling processing with respect to the analog signals that have been inputted from the CCD 24 and thereafter sequentially outputs the analog signals to the ADC 28.

The ADC 28 converts the analog signals of each of R, G and B that have been inputted from the analog signal processor 26 into R, G and B signals (digital image data) of 12 bits each and sequentially outputs these digital signals to the digital signal processor 30. The digital signal processor 30 accumulates the digital image data that are sequentially inputted from the ADC 28 in the housed line buffer and temporarily directly stores the digital image data in a predetermined region of the memory 48.

The digital image data stored in the predetermined region of the memory 48 are read by the digital signal processor 30 in response to a control by the CPU 40. The digital signal processor 30 performs white balance adjustment by applying a digital gain corresponding to a predetermined physical quantity, performs gamma processing and sharpness processing, and generates digital image data of a predetermined number of bits, such as 8 bits, for example.

Then, the digital signal processor 30 administers YC signal processing with respect to the generated digital image data of the predetermined number of bits, generates a brightness signal Y and chroma signals Cr and Cb (below, called "YC signals"), and stores the YC signals in a region that is different from the predetermined region of the memory 48. Consequently, the CPU 40 controls the digital signal processor 30 and detects a brightness level from target region image data that correspond to a detection target region, which is a region that includes a subject that is a detection target of the digital image data.

The LCD 38 is configured as a display that displays a moving image (a through-image) that has been obtained by continuous image shooting by the CCD 24, and can be used as a viewfinder. When the LCD 38 is used as a viewfinder, the YC signals that have been generated are sequentially outputted to the LCD 38 via the LCD interface 36. Thus, a through-image is displayed on the LCD 38.

Here, when the release button 56A is pressed to the half-pressed state by a user, the AE function operates and exposure conditions are set as discussed above. Thereafter, the AF function operates and focusing is controlled. Thereafter, when the release button 56A is further pressed to the fully pressed state, the YC signals that are stored in the memory 48 at this point in time are compressed in a predetermined compression format (in the exemplary embodiments, a JPEG format) by the compression/decompression circuit 54 and are thereafter recorded in the memory card 52 via the external memory interface 50.

Next, processing that is executed by the CPU 40 of the digital camera 10 will be described.

The digital camera 10 pertaining to the exemplary embodiments performs dimming to adjust the flash amount of the flash when performing image shooting with the flash, by two-time exposure of non-flash exposure and pre-flash exposure (below, simply called "flash exposure").

When the digital camera 10 performs non-flash exposure or flash exposure, the digital camera 10 detects a brightness level from target region image data, which correspond to a detection target region that includes a subject, of the digital image data that have been outputted by the image shooting system. At this time, when a detection target region in non-flash exposure or a detection target region in flash exposure end up shifting (displacing) because of camera shake, the digital camera 10 becomes unable to perform dimming correctly.

Figure 3:
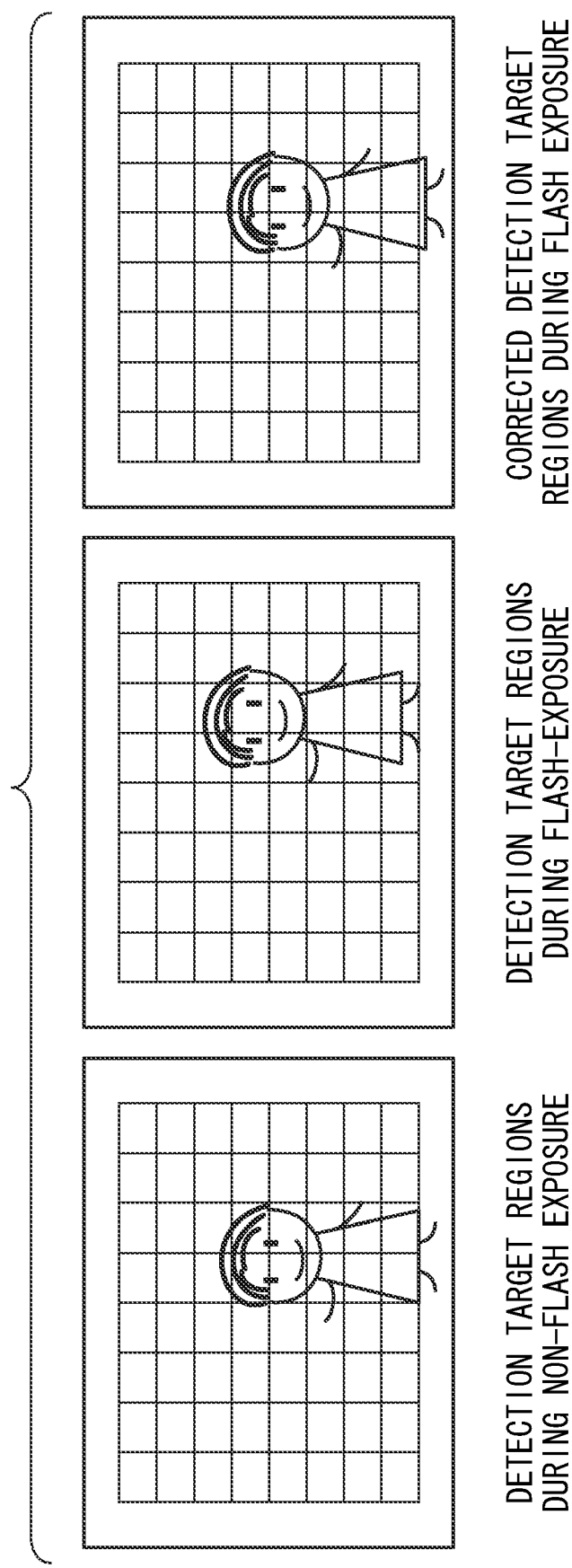
FIG. 3 is a schematic diagram showing a subject when detection target regions during flash exposure have been corrected on the basis of positions of detection target regions during non-flash exposure.

Consequently, in the exemplary embodiments, the digital camera 10 is configured such that, as shown in FIG. 3, positions of detection target regions during non-flash exposure and detection target regions during flash exposure with respect to a subject are substantially matched with each other. The detection target region may include plural detection target regions as represented by the plural rectangles shown in FIG. 3. FIG. 3 is a schematic diagram showing a subject when detection target regions during flash exposure have been corrected on the basis of detection target regions during non-flash exposure. As shown in FIG. 3, the position of the corrected detection target regions during flash exposure with respect to the subject is corrected to substantially match that of the detection target regions during non-flash exposure.

In FIG. 3, the detection target regions are, as mentioned above, configured by plural rectangles. In this case, the digital camera 10 detects a brightness level for each detection target region represented by the respective rectangles and, therefore, plural brightness levels are obtained. However, the digital camera 10 may also be configured to detect a brightness level from only one region.

Below, a specific flow of camera shake-correction dimming processing, which is a series of processing from when the release button 56A is pressed by a user until image shooting, will be described using flowcharts.

Figure 4:
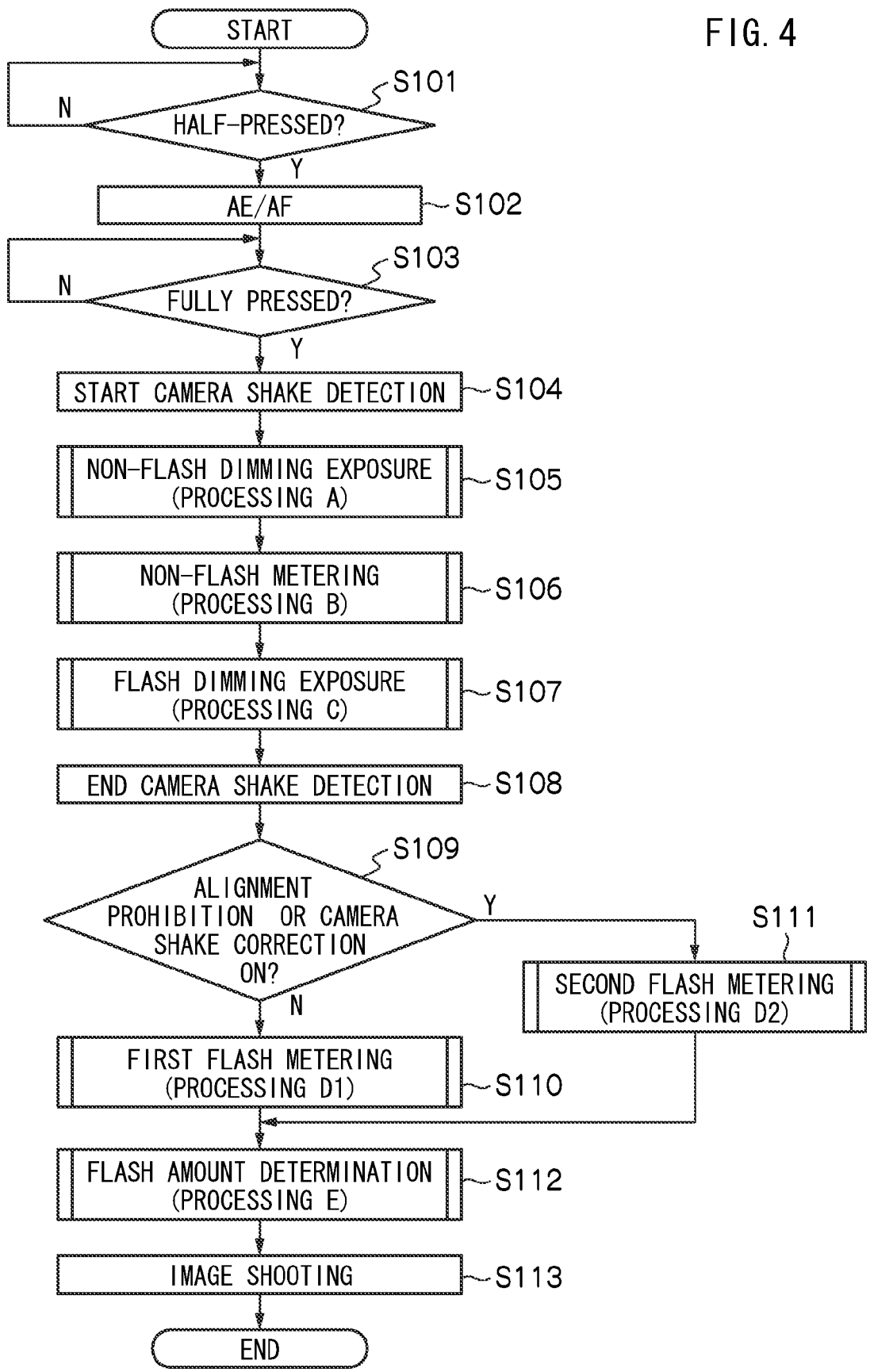
FIG. 4 is a flowchart showing an overall flow of camera shake-correction dimming processing.

The flowchart shown in FIG. 4 shows an overall flow of camera shake-correction dimming processing. First, in step 101, it is determined whether or not the release button 56A has been pressed to the half-pressed state by the user. When it is determined that the release button 56A has been pressed to the half-pressed state by the user, AE/AF functions are executed in step 102.

Thereafter, in step 103, it is determined whether or not the release button 56A has been pressed to the fully pressed state. When it is determined that the release button 56A has been pressed to the fully pressed state by the user, camera shake detection by the shift detector 58 in step 104 is initiated.

In step 105, non-flash dimming exposure (below, called "processing A") is executed to perform dimming exposure in a state in which the flash 44 is not emitting light. In step 106, non-flash metering is executed to detect a brightness level from target region image data, which correspond to a detection target region that includes a subject, of digital image data that have been obtained when the dimming exposure is performed without emitting light from the flash 44.

In step 107, flash dimming exposure (below, called "processing C") is executed to perform dimming exposure in a state in which the flash 44 is emitting light. In step 108, camera shake detection by the shift detector 58 is ended.

In step 109, it is determined whether either of "alignment prohibition" or "camera shake correction" is set to an ON setting. The alignment prohibition is a setting (mode) that prohibits correction, at a metering stage, whereby the positions of the detection target regions during non-flash exposure and during flash exposure with respect to the subject are substantially matched with each other. Further, an ON setting of the camera shake correction in this instance means that the image shooting system outputs, at the time of exposure, digital image data in which displacement between a subject position in the digital image data obtained during non-flash exposure and a subject position in the digital image data obtained during flash exposure has been corrected on the basis of the shift amount detected by the shift detector 58.

When the determination in step 109 is negative, then in step 110, first flash metering (below, called "processing D1") is executed to correct digital image data obtained during the flash exposure such that the position of a detection target region therein with respect to the subject substantially matches the position of the detection target region in the digital image data obtained during the non-flash exposure, and to detect a brightness level from target region image data that correspond to the detection target region during the flash exposure. Then, the processing advances to step 112.

On the other hand, when the determination in step 109 is affirmative, then in step 111, second flash metering (below, called "processing D2") is executed to detect a brightness level from target region image data that correspond to the detection target region during the flash exposure. Then, the processing advances to step 112.

Here, in step 111, since the camera shake correction has already been performed on the digital image data obtained during flash exposure, shifting (displacement) of the detection target region does not arise in the digital image data obtained during flash exposure, and the positions with respect to the subject of the detection target regions during the non-flash exposure and the flash exposure are consequently substantially matched even when correction is not performed in step 111.

In step 112, the flash amount of the flash 44 is determined (processing E) on the basis of the brightness level detected in step 106, step 110 or step 111. In step 113, image shooting is executed, and then the processing is terminated.

In this manner, in the camera shake-correction dimming pertaining to the exemplary embodiments, the image data obtained with emission of light from the flash 44 is corrected on the basis of the shift amount, between the position of the subject in the image data obtained without emission of light from the flash 44 and the position of the subject in the image data obtained with emission of light from the flash 44, that has been detected by the shift detector 58. Further, as shown in FIG. 3, a brightness level can be detected from each of the plural sets of target region data that correspond to the plural detection target regions.

Figure 5:
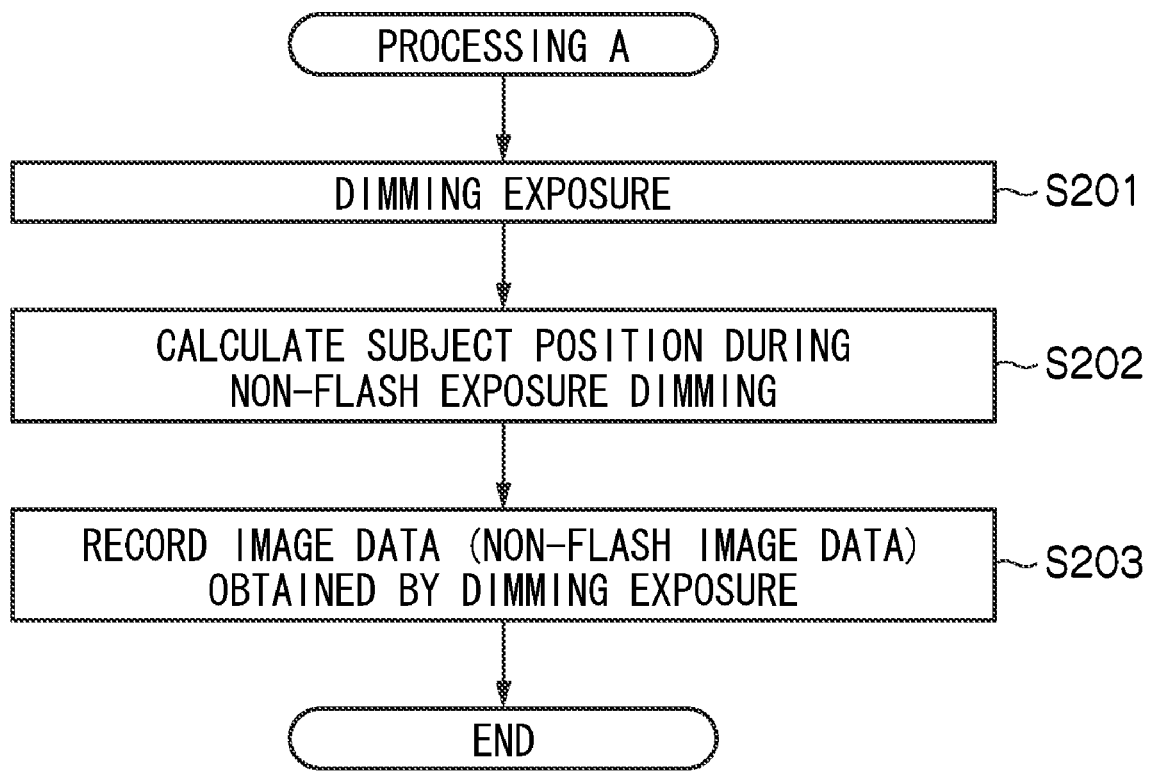
FIG. 5 is a flowchart showing a flow of processing A in a first exemplary embodiment.

Below, the details of processing A to processing E will be described using flowcharts. First, processing A in a first exemplary embodiment will be described using the flowchart of FIG. 5.

Since processing A is non-flash exposure processing, light emission by the flash 44 is not performed. In the first step 201, dimming exposure is performed. In step 202, the position of a subject (subject position) in an image obtained during non-flash exposure dimming is calculated. In step 203, the image data (non-flash image data) that have been obtained by dimming exposure are recorded and the processing is terminated. The position calculation may also be a processing to simply determine a position in the obtained image that is used as a reference.

Figure 6:
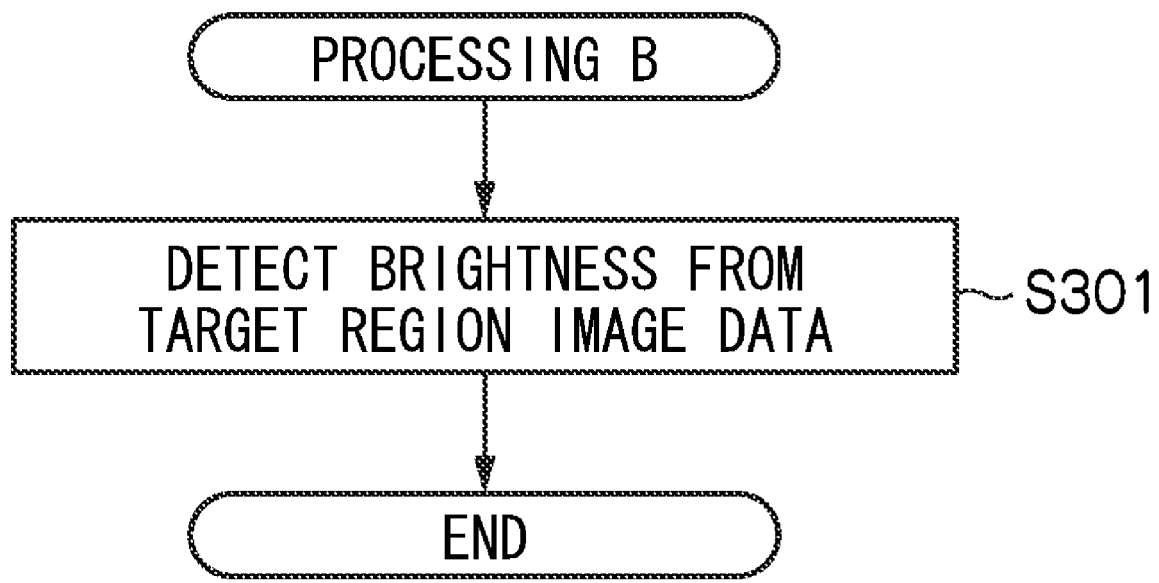
FIG. 6 is a flowchart showing a flow of processing B in the first exemplary embodiment.

Processing B in the first exemplary embodiment will be described using the flowchart of FIG. 6. In processing B, a brightness level of target region image data included in the non-flash image data is detected in step 301.

Figure 7:
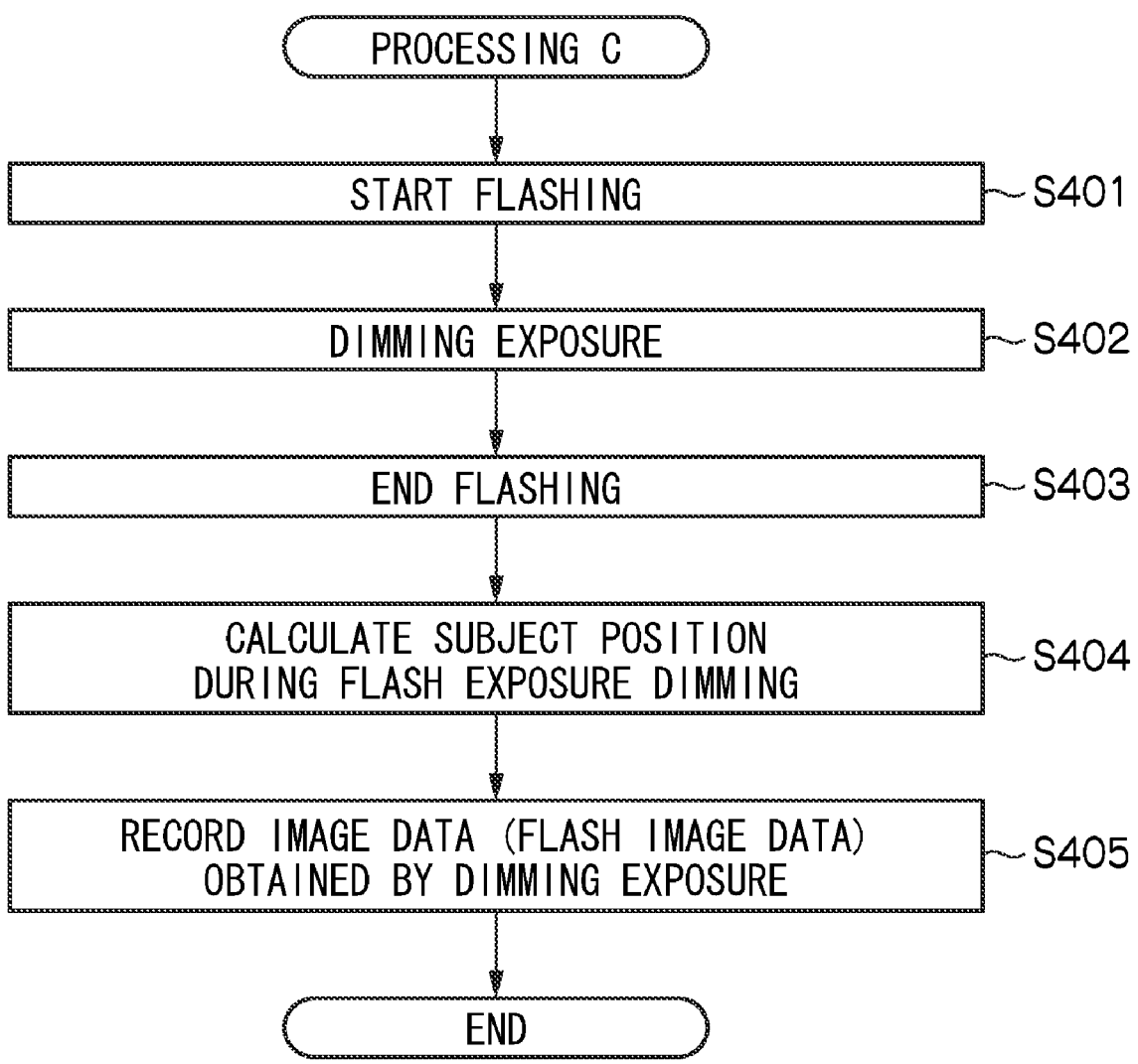
FIG. 7 is a flowchart showing a flow of processing C in the first exemplary embodiment.

Processing C in the first exemplary embodiment will be described using the flowchart of FIG. 7. Since processing C is flash exposure processing, light emission by the flash 44 is performed. Consequently, in step 401, the flash 44 starts light emission. In step 402, dimming exposure is performed. In step 403, the flash 44 ends light emission. In step 404, the position of the subject (subject position) in image data obtained during flash exposure dimming is calculated. In step 405, the image data (flash image data) that have been obtained by dimming exposure are recorded and the processing is terminated.

Figure 8:
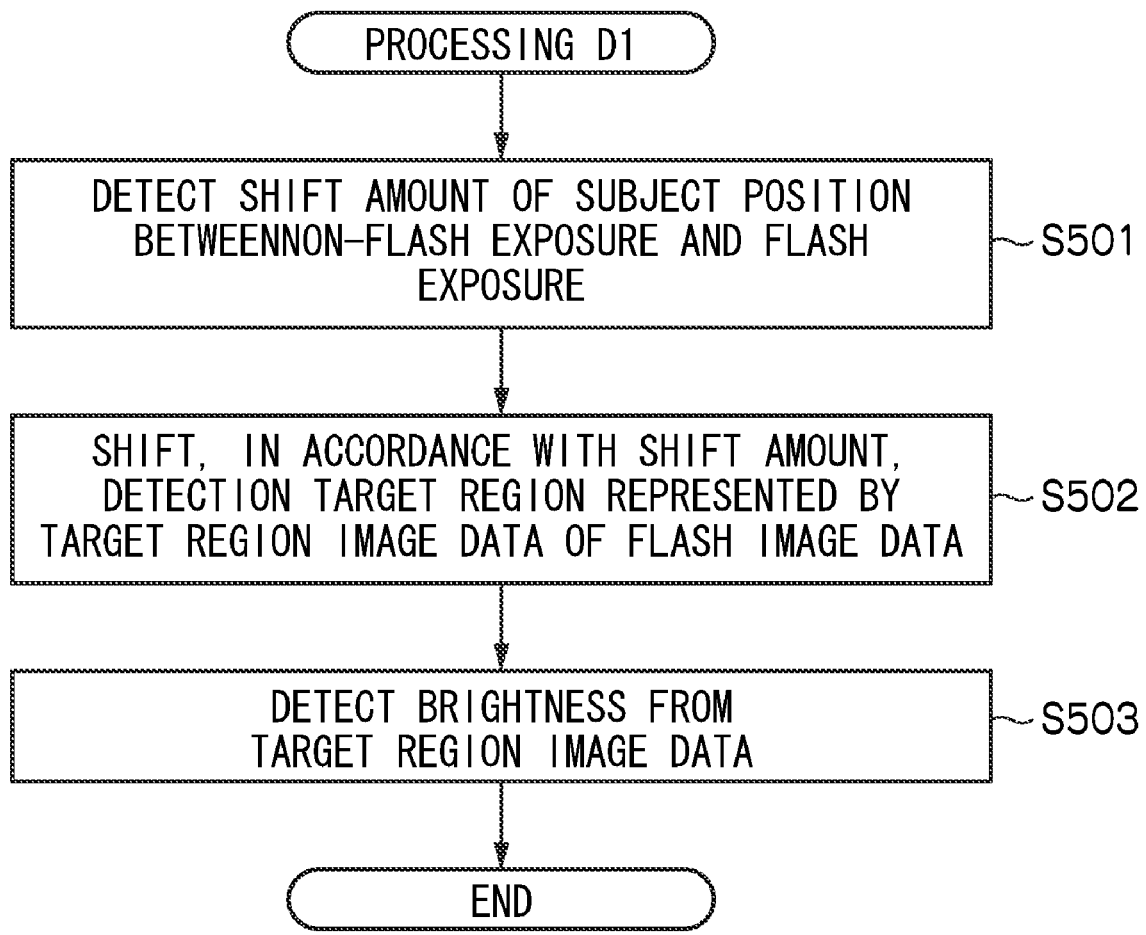
FIG. 8 is a flowchart showing a flow of processing D1 in the first exemplary embodiment.

Processing D1, which is flash metering processing, in the first exemplary embodiment will be described using the flowchart of FIG. 8. First, in step 501, a shift amount between the subject position in the flash image data and the subject position in the non-flash image data is detected. In step 502, the digital camera 10 shifts, in accordance with the shift amount, the detection target region represented by target region image data in the flash image data. In step 503, a brightness level is detected from the target region image data in the flash image data and the processing is terminated.

Figure 9:
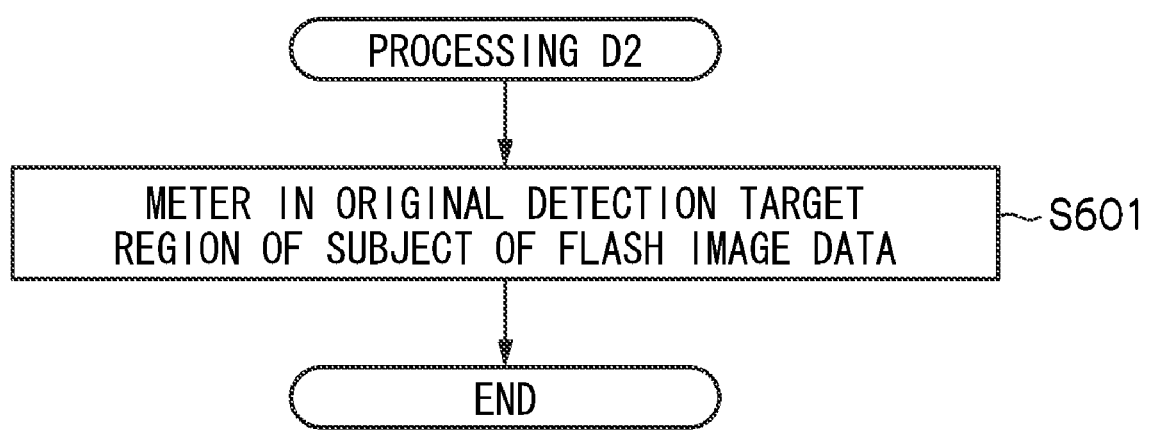
FIG. 9 is a flowchart showing a flow of processing D2 in the first exemplary embodiment.

Processing D2, which is flash metering processing, in the first exemplary embodiment will be described using the flowchart of FIG. 9. This processing is performed when either of "alignment prohibition" or "camera shake correction" is set to an ON setting. Consequently, the position of the detection target region in the flash image data is not shifted (corrected), and in step 601, metering is performed on the original detection target region of the flash image data and the processing is terminated.

In this manner, the digital camera 10 can be configured such that, when the image shooting system outputs, at the time of exposure, image data in which the shift of the subject position in the obtained image has been corrected on the basis of the shift amount that has been detected by the shift detector 58, a correction using the shift amount is not performed when performing metering.

Figure 10:
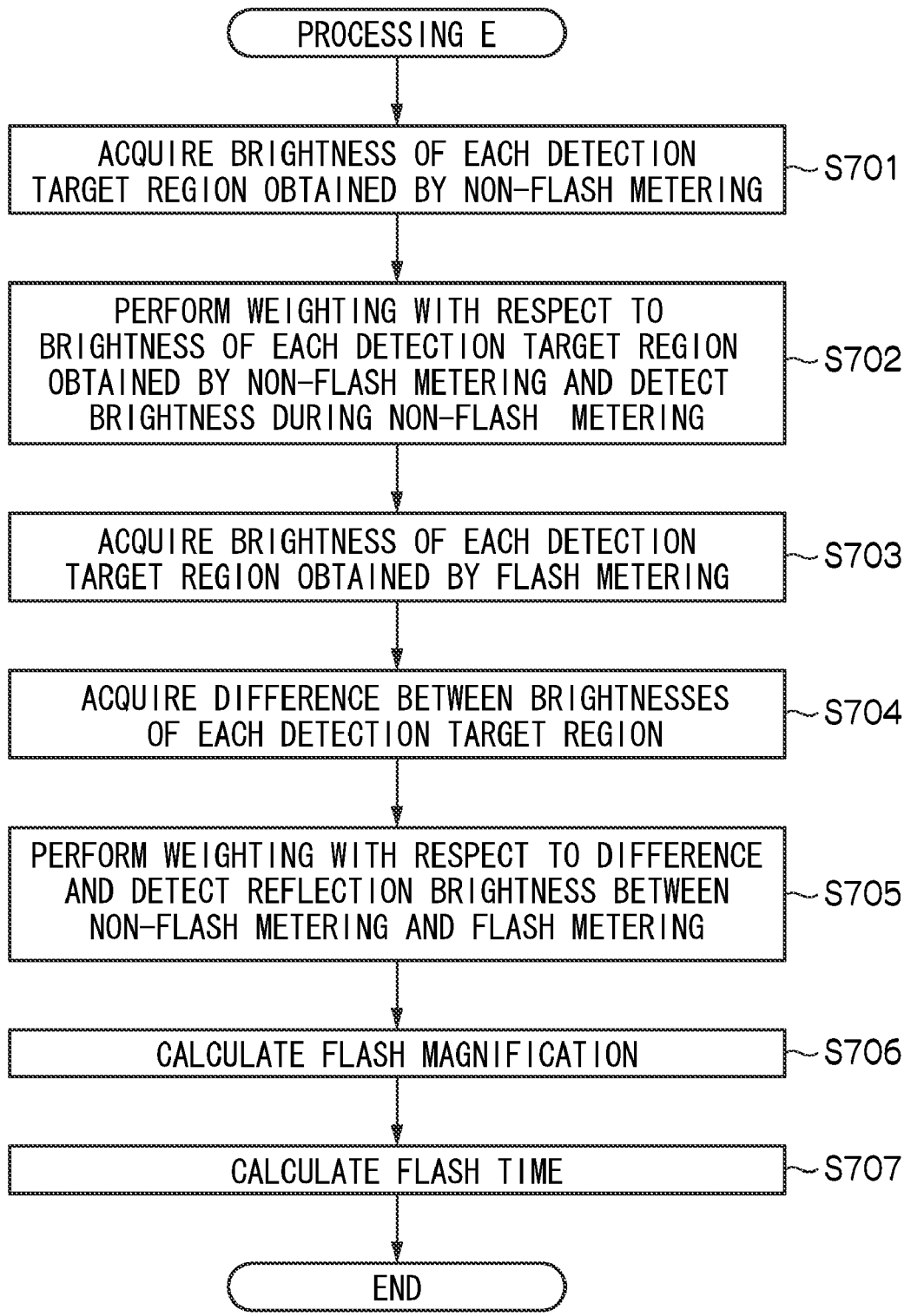
FIG. 10 is a flowchart showing a flow of processing E.

Next, processing E will be described using the flowchart of FIG. 10, and FIG. 11A and FIG. 11B. FIG. 11A is a diagram showing the relationship between a subject and detection target regions, and FIG. 11B is a diagram showing weighting factors that are used when performing weighted averaging using brightness levels that have been obtained in detection target regions.

First, in step 701, the brightness of each detection target region of the non-flash image data is read out. In step 702, weighting is performed using the aforementioned weighting factors with respect to the brightness of each detection target region and the brightness (non-flash brightness) level in non-flash metering is determined. In step 703, the brightness of each detection target region of the flash image data is read out.

In step 704, the differences between the brightness levels of each of the detection target regions of the flash image data and the non-flash image data are determined. Specifically, for each detection target region, the difference between the brightness levels of the detection target region during flash exposure and the corresponding detection target region during non-flash exposure is determined. In step 705, weighting is performed with respect to each of the obtained differences and reflection brightness levels of both non-flash metering and flash metering are determined.

Then, flash magnification calculation is performed in step 706. In step 707, the flash time is calculated to thereby determine the flash amount of the flash 44.

The flash magnification may be calculated using the equation: (target brightness−non-flash brightness)/reflection brightness.

Figure 12A:
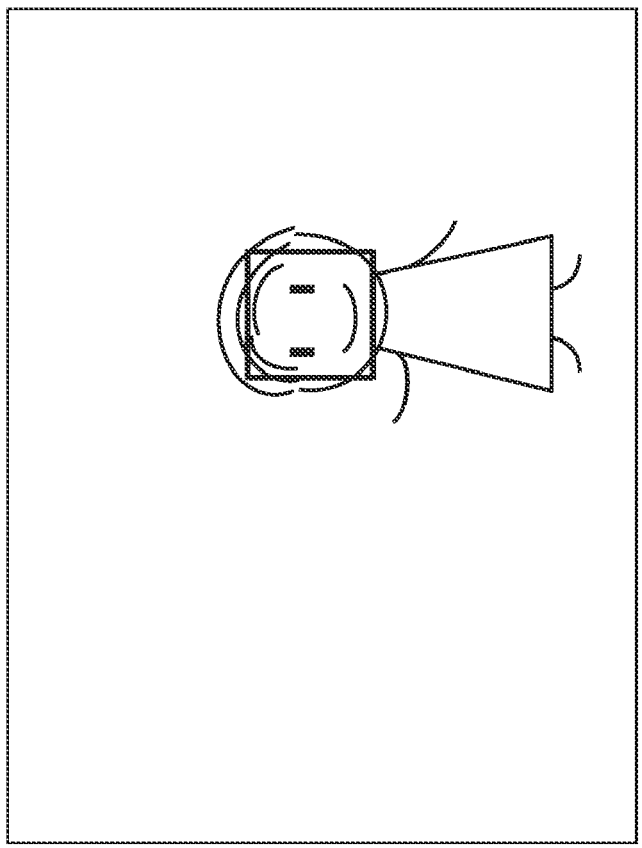
FIG. 12A and FIG. 12B are diagrams showing image data obtained in non-flash exposure and in flash exposure when a human face serves as a detection target region.
Figure 12B:
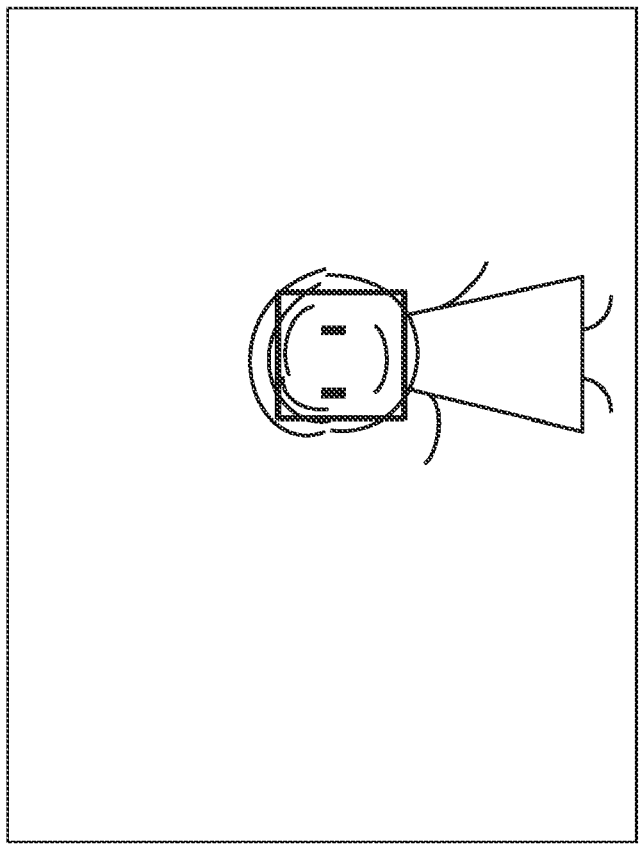

In the processing described above, a human face may, as shown in FIG. 12A and FIG. 12B, serve as the detection target region. In this case, as shown in FIG. 12A and FIG. 12B, when a shift has arisen between the subject position in the image data obtained during non-flash exposure and the subject position in the image data obtained during flash exposure, a human face detected by the face detector 60 is used as the detection target region, and the positions of the detection target regions during non-flash exposure and during flash exposure are corrected to be substantially the same relative to the respective subject positions.

In this manner, in the camera shake-correction dimming pertaining to the exemplary embodiment, target region image data of which the brightness level is detected may be image data that represent a region including a human face that is detected by the face detector 60.

In this case, since face detection processing is processing that requires a comparatively large amount of time, there is a possibility that the face detection will not be completed during the flash exposure. However, the position of the face can be determined using the position of the face that has been detected prior to the flash exposure and the shift amount of the subject position obtained by the shift detector 58.

Next, a second exemplary embodiment, that performs averaging processing using an average subject position during dimming to substantially match the positions of detection target regions with respect to the respective subject positions during non-flash exposure and during flash exposure, will be described.

Figure 13:
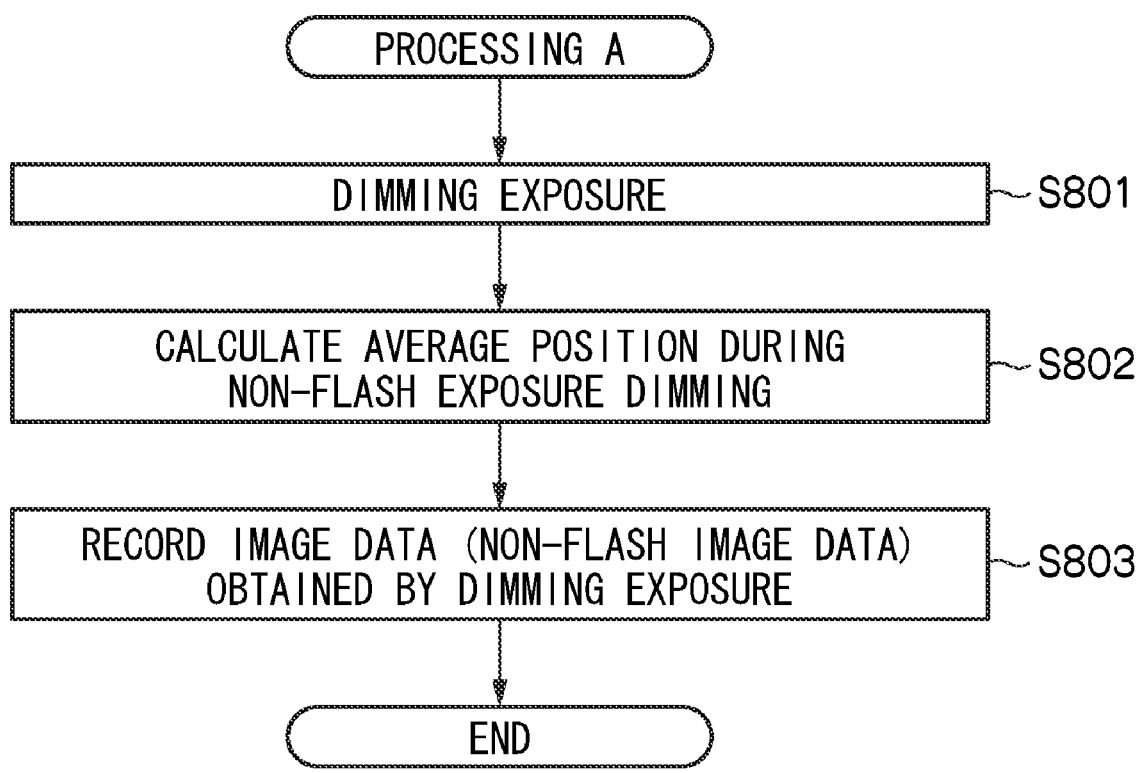
FIG. 13 is a flowchart showing a flow of processing A in a second exemplary embodiment.

Processing A in the second exemplary embodiment will be described using the flowchart of FIG. 13. First, in step 801, dimming exposure is performed. In step 802, an average subject position in an image captured during non-flash exposure dimming is calculated. In step 803, image data (non-flash image data) obtained by dimming exposure is recorded and the processing is terminated.

For the subsequent processing B, processing B according to the first exemplary embodiment can be applied as is even when the digital camera 10 performs averaging processing.

Figure 14:
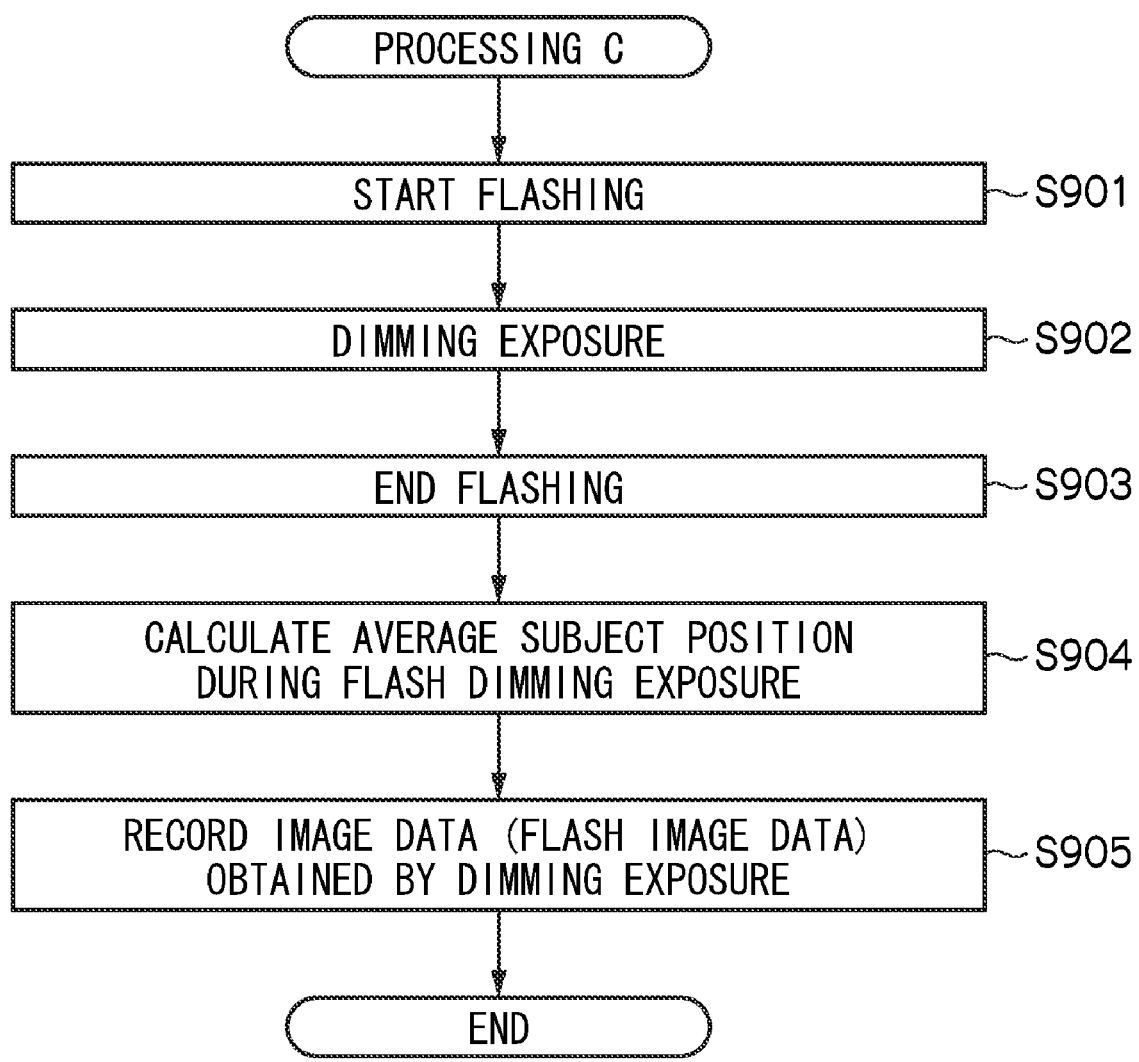
FIG. 14 is a flowchart showing a flow of processing C in the second exemplary embodiment.

Processing C in the second exemplary embodiment will be described using the flowchart of FIG. 14. In step 901, the flash 44 starts light emission. In step 902, dimming exposure is performed. In step 903, the flash 44 ends light emission. In step 904, an average subject position in an image captured during flash exposure dimming is calculated. In step 905, image data (flash image data) obtained by dimming exposure is recorded and the processing is terminated.

Figure 15:
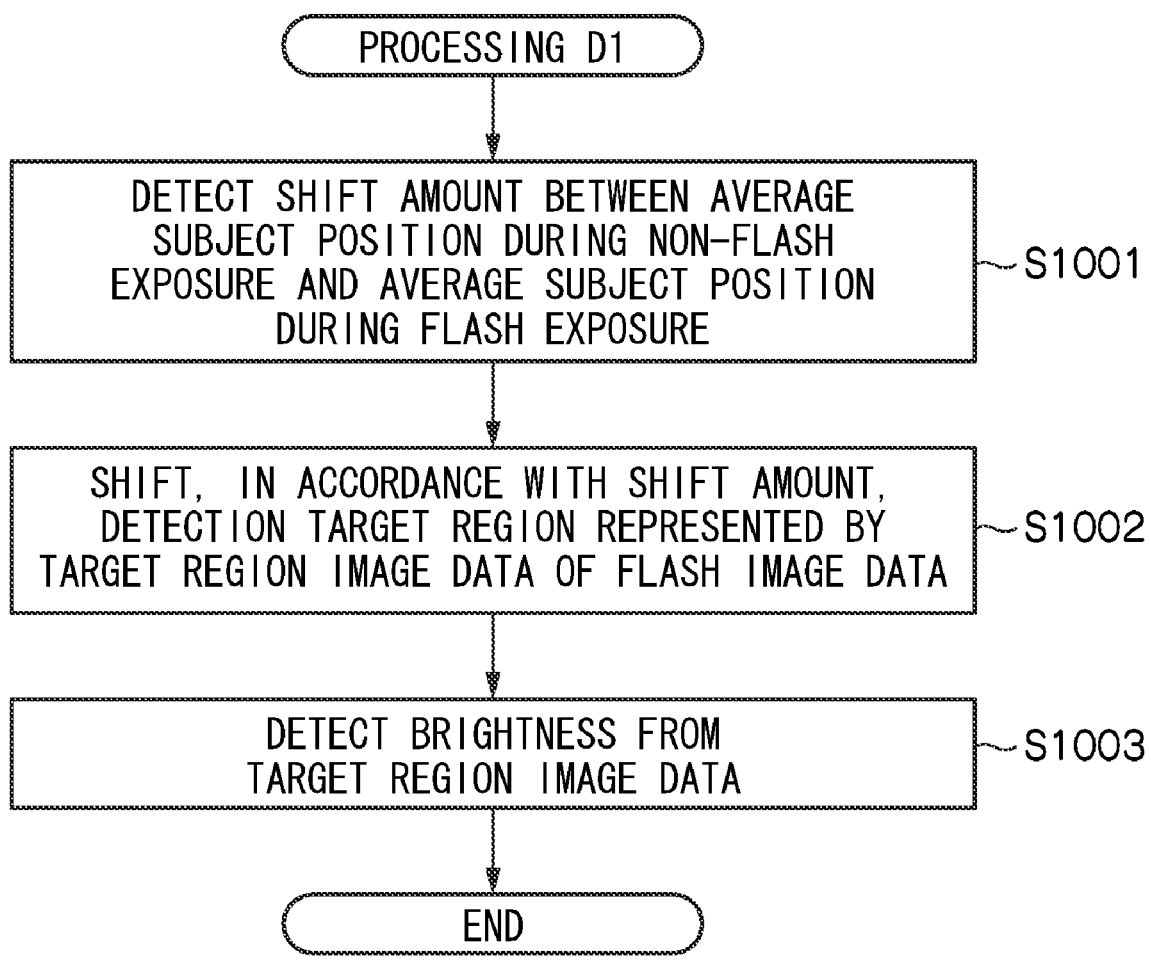
FIG. 15 is a flowchart showing a flow of processing D1 in the second exemplary embodiment.

Processing D1 in the second exemplary embodiment will be described using the flowchart of FIG. 15. First, in step 1001, the shift amount between the average subject position during non-flash exposure and the average subject position during flash exposure is detected. In step 1002, the detection target region represented by the target region image data of the flash image data is shifted in accordance with the shift amount. In step 1003, the brightness level of the target region image data of the flash image data is detected and the processing is terminated.

For processing D2, processing D2 according to the first exemplary embodiment can be applied as is even when the digital camera 10 performs averaging processing. By using the average subject positions in this manner, the correction whereby the detection target regions during non-flash exposure and during flash exposure are substantially matched with each other with respect to the respective subject positions, can be performed more precisely.

Figure 16:
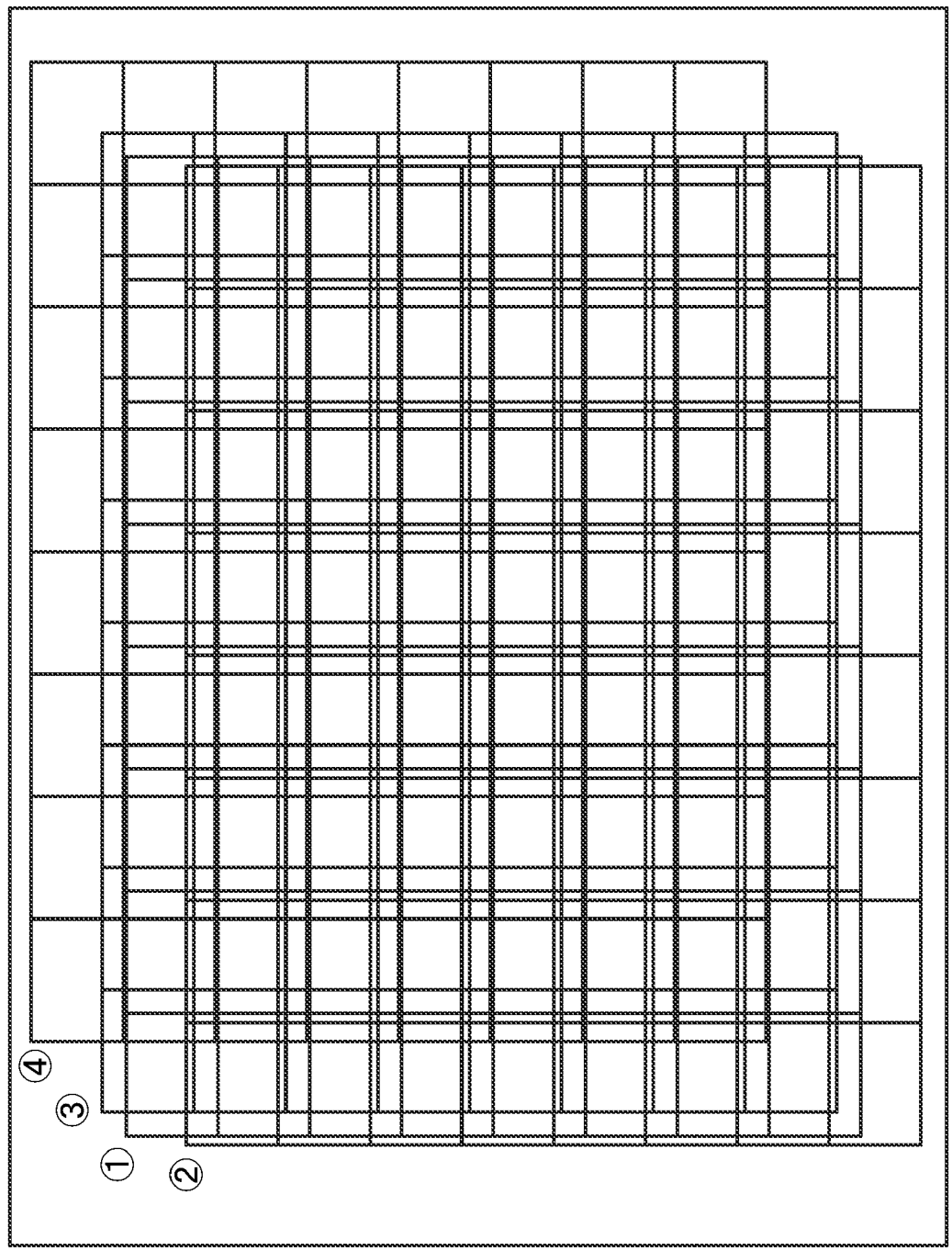
FIG. 16 is a schematic diagram showing position shifting when the digital camera is configured to use an average of four subject positions in both non-flash exposure dimming and flash exposure dimming.

In the aforementioned processing, the digital camera 10 uses average values of the subject positions in the image data obtained during non-flash exposure dimming and during flash exposure dimming. The average value of the subject position in the image data may be obtained by detecting the subject position plural times during the exposure at S801. For example, the digital camera 10 may be configured to precisely calculate subject positions at plural timings and use the average value thereof. Specifically, as shown in FIG. 16, the digital camera 10 may be configured to use, for example, an average position of four subject positions during non-flash exposure dimming and four subject positions during flash exposure dimming. The four subject positions can be, when t represents the amount of time that is required for dimming exposure, subject positions in time bands of 0 to t/4, t/4 to t/2, t/2 to 3t/4 and 3t/4 to t.

Figure 17:
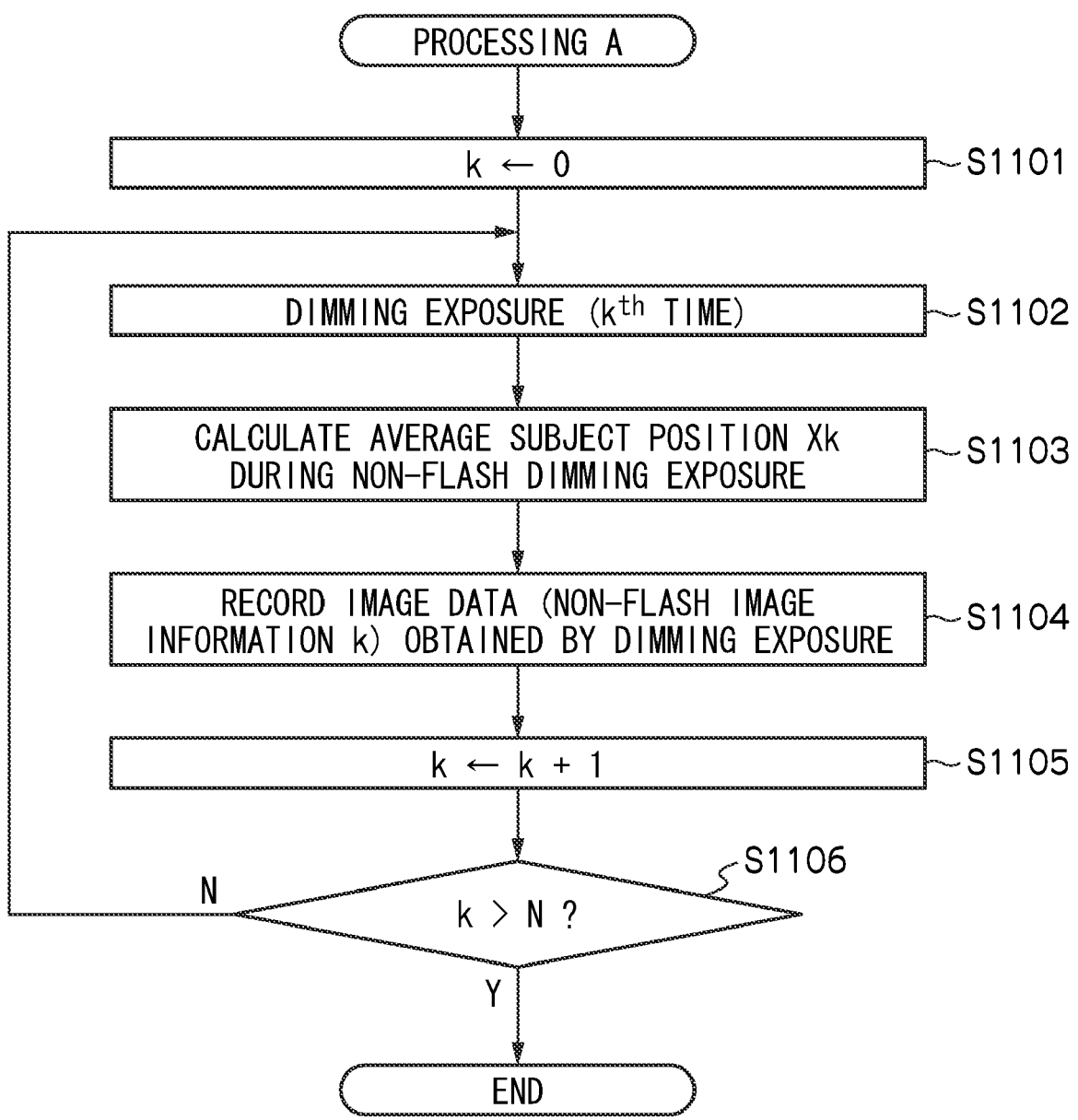
FIG. 17 is a flowchart showing a flow of processing A in a third exemplary embodiment.

A third exemplary embodiment that performs averaging processing N times to determine the average brightness over N times during non-flash exposure dimming and flash exposure dimming will be described. First, processing A in the third exemplary embodiment will be described using the flowchart of FIG. 17. First, in step 1101, a counter k is assigned a value of 0. In the next step 1102, dimming exposure is performed for the $k^{th}$ time. Then, in step 1103, an average subject position $X_k$ during non-flash exposure dimming for the $k^{th}$ time is calculated.

In step 1104, image data (non-flash image data k) that have been obtained by dimming exposure is recorded. In step 1105, the counter k is incremented by one. In step 1106, it is determined whether or not k exceeds N. When k does not exceed N, the flow returns to the processing of step 1102. When k exceeds N, the processing is terminated.

Figure 18:
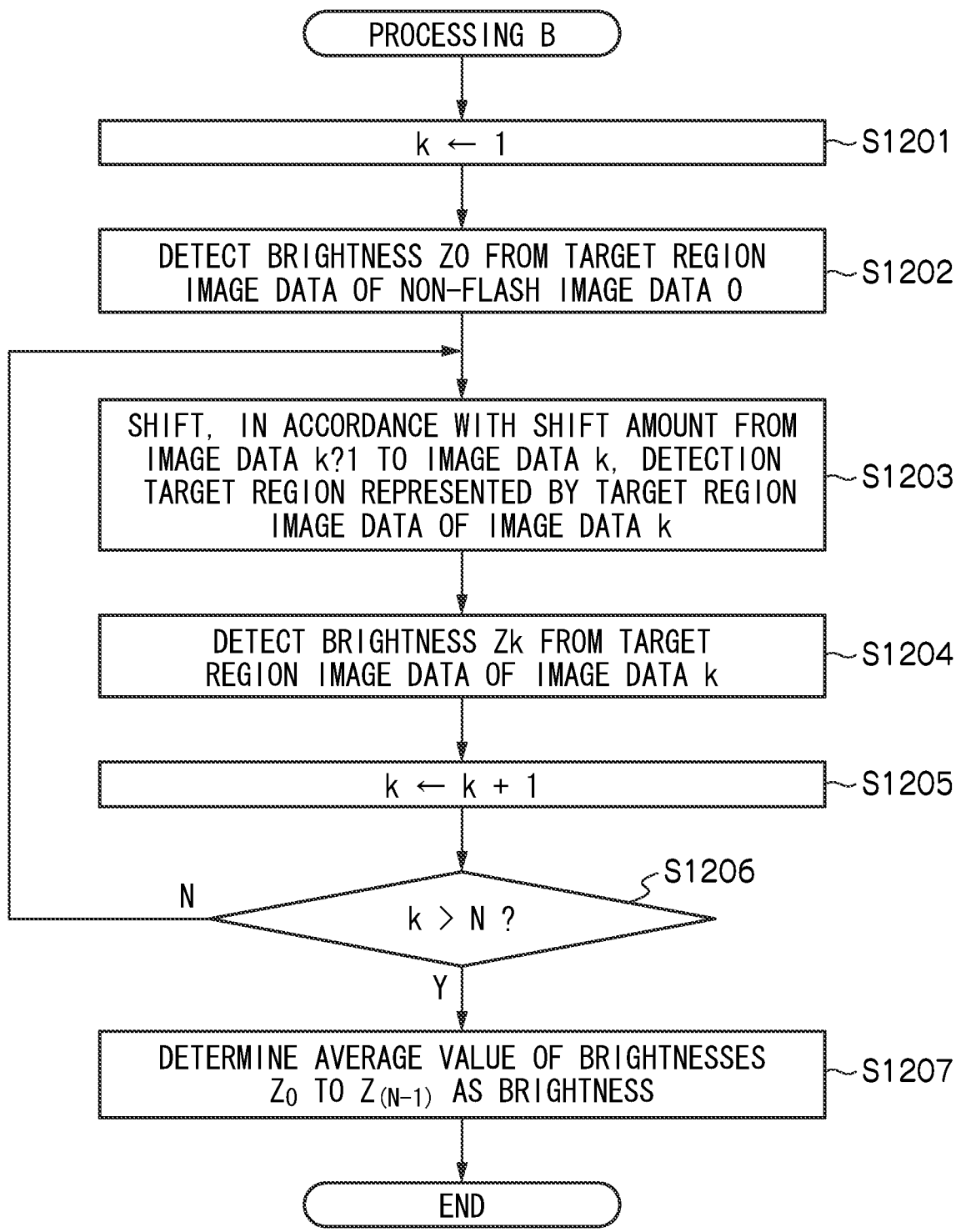
FIG. 18 is a flowchart showing a flow of processing B in the third exemplary embodiment.

Processing B in the third exemplary embodiment will be described using the flowchart of FIG. 18.

First, in step 1201, the counter k is assigned a value of 1. In step 1202, a brightness level $Z_0$ is detected from target region image data of non-flash image data 0 of the non-flash image data k.

In step 1203, the detection target region represented by the target region image data of the non-flash image data k is shifted in accordance with the shift amount of the subject position between non-flash image data k and non-flash image data k−1. In step 1204, a brightness level $Z_k$ is detected from target region image data of the non-flash image data k. In step 1205, the counter k is incremented by one. In step 1206, it is determined whether or not k exceeds N. When k does not exceed N, the flow returns to the processing of step 1203. When k exceeds N, then in step 1207, a weighted average value or an average value of the brightness levels $Z_0$ to $Z_{(N-1)}$ is determined as the brightness level during non-flash exposure and the processing is terminated.

Only one of the non-flash image data sets having the same subject position as another among the N sets of the non-flash image data need be used as a representative for detecting the brightness level.

Figure 19:
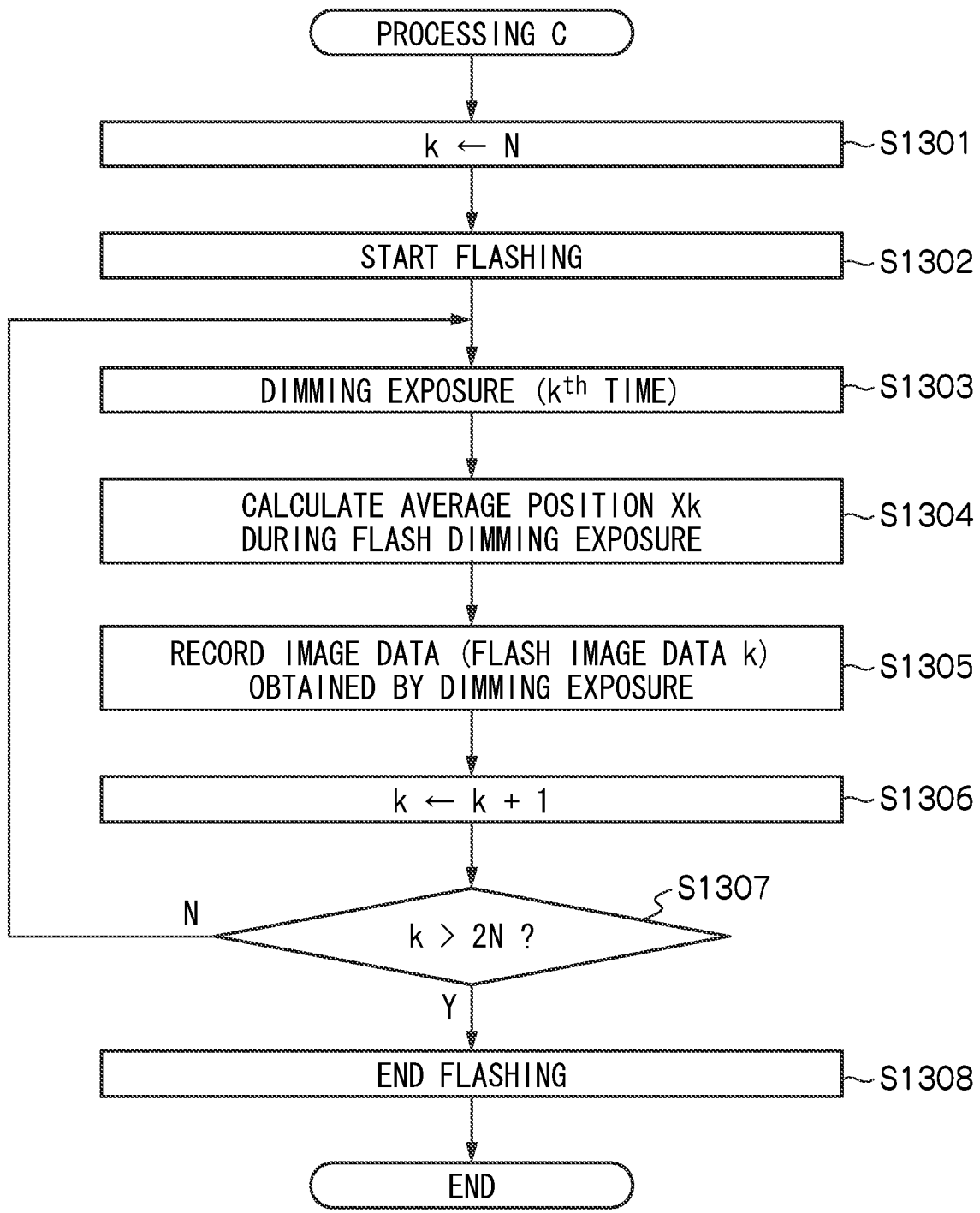
FIG. 19 is a flowchart showing a flow of processing C in the third exemplary embodiment.

Processing C of the third exemplary embodiment will be described using the flowchart of FIG. 19. First, in step 1301, the counter k is assigned a value of N. In step 1302, the flash 44 starts light emission. In step 1303, dimming exposure is performed for the $k^{th}$ time. In step 1304, an average subject position $X_k$ during non-flash exposure dimming for the $k^{th}$ time is calculated.

Then, in step 1305, image data (flash image data k) that have been obtained by dimming exposure are recorded. In step 1306, the counter k is incremented by one. In step 1307, it is determined whether or not k exceeds 2N. When k does not exceed 2N, the flow returns to the processing of step 1303. When k exceeds 2N, then in step 1308, the flash 44 ends light emission and the processing is terminated.

Figure 20:
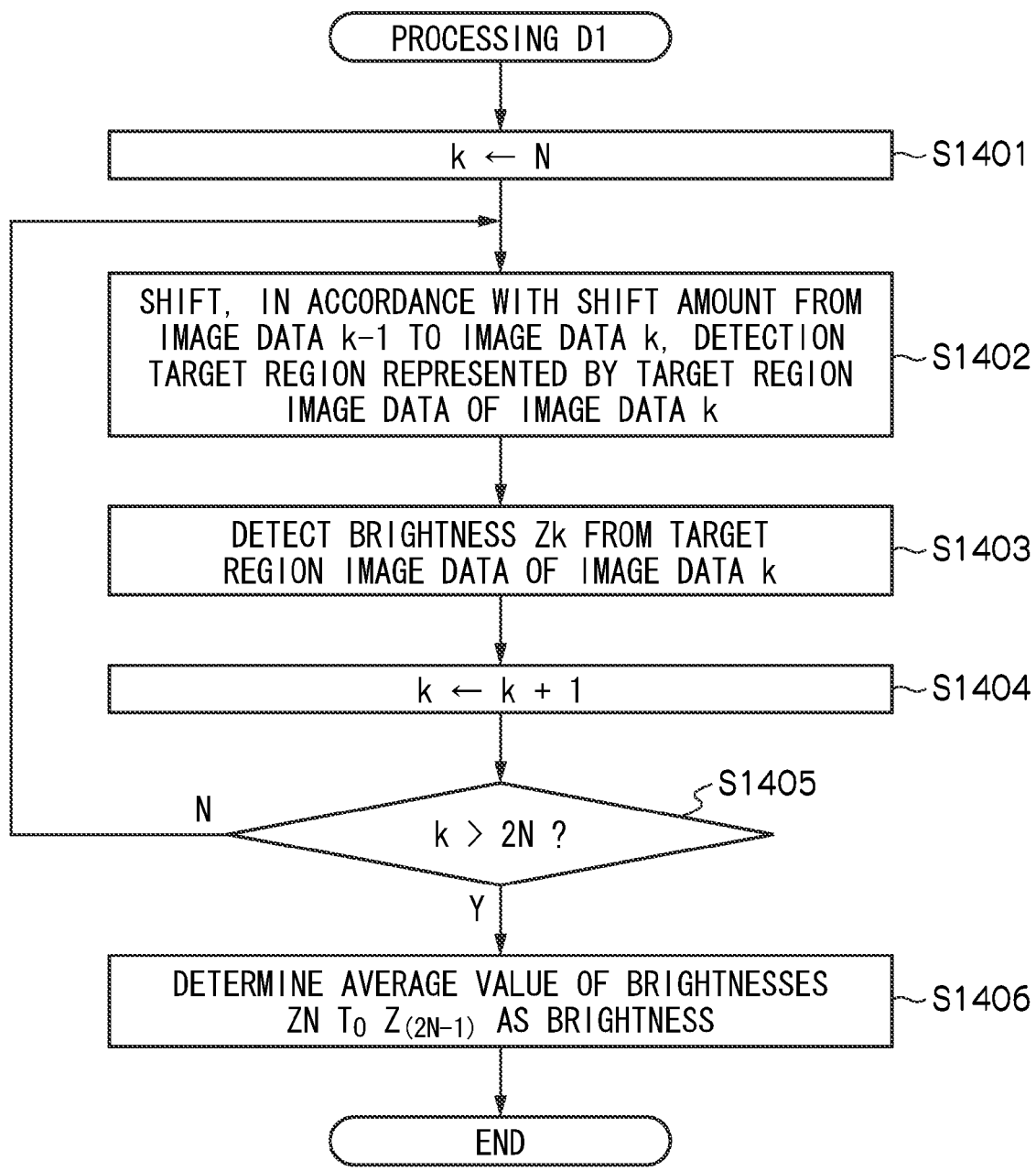
FIG. 20 is a flowchart showing a flow of processing D1 in the third exemplary embodiment.

Processing D1 in the third exemplary embodiment will be described using the flowchart of FIG. 20. First, in step 1401, the counter k is assigned a value of N. In step 1402, the detection target region represented by the target region image data in the flash image data is moved in accordance with the shift amount between the subject positions of image data k and image data k−1. In step 1403, a brightness level $Z_k$ of the target region image data of the flash image data k is detected. In step 1404, the counter k is incremented by one. In step 1405, it is determined whether or not k exceeds 2N. When k does not exceed 2N, the flow returns to the processing of step 1402. When k exceeds 2N, then in step 1406, a weighted average value or an average value of the brightness levels ZN to Z(2N−1) is determined as the brightness level during non-flash exposure and the processing is terminated.

Only one of the flash image data sets having the same subject position as another among the N sets of the flash image data need be used as a representative for detecting the brightness level.

For processing E, when performing the N-times averaging processing, processing E according to the first exemplary embodiment can be applied as is. Further, for processing D2, when performing the N-times averaging processing, processing D2 according to the first exemplary embodiment can be applied as is.

Figure 21:
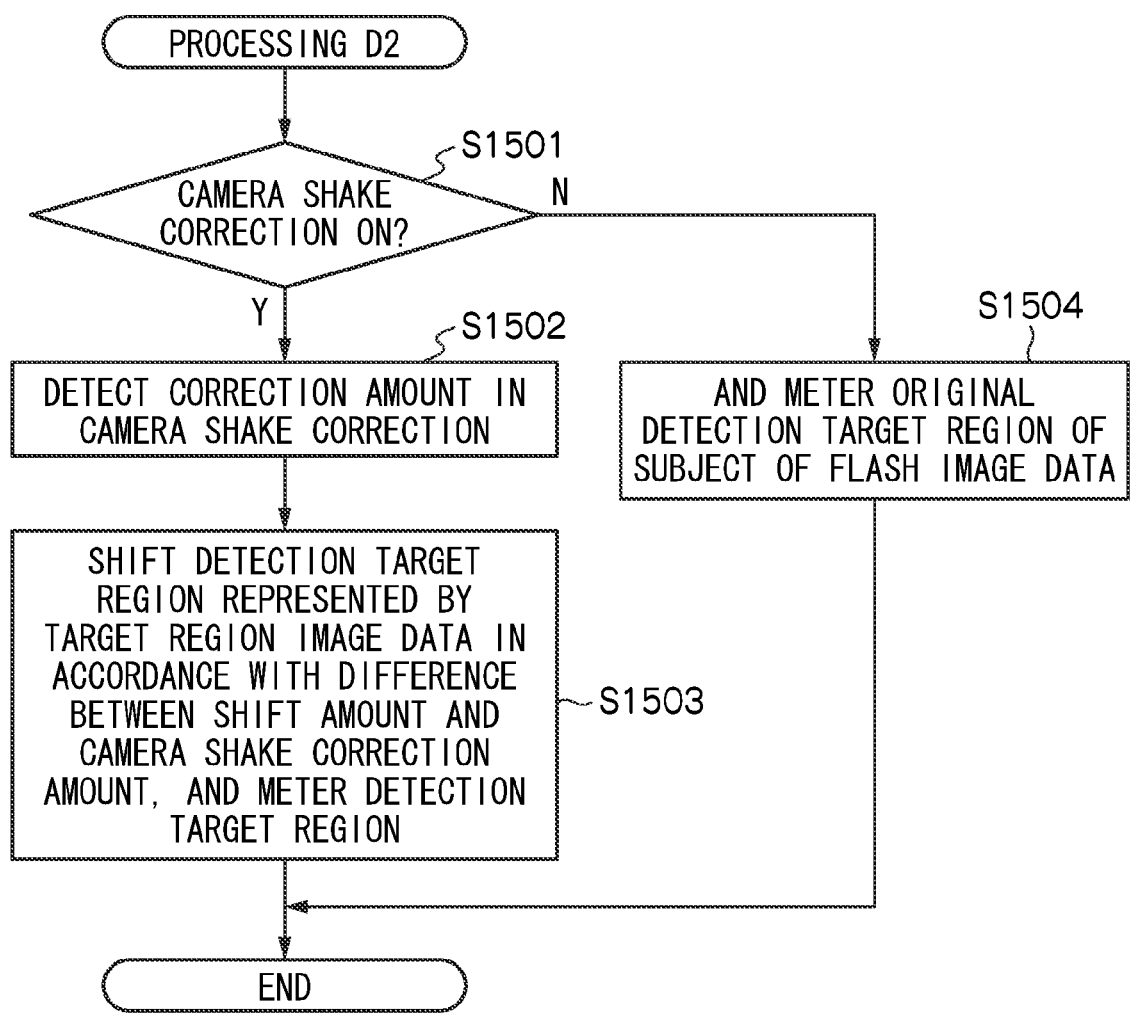
FIG. 21 is a flowchart showing a flow of a modified example of processing D2.

A modified example of processing D2 will be described using the flowchart of FIG. 21. This processing is performed when the determination of whether or not the alignment prohibition or the camera shake correction is set to an ON setting is affirmative in step 109 of FIG. 4 and, in particular, when the camera shake correction is set to an ON setting. Further, this processing is performed when the image shooting system outputs image data in which shift (displacement) of the subject position in the image data obtained at the time of flash exposure has been corrected by a correction amount within a predetermined range, on the basis of the shift amount detected by the shift detector 58. In this case, if the shift amount is large, the shift may not have been completely corrected by the correction amount within a predetermined range.

Accordingly, it is necessary to correct the flash image data on the basis of the shift amount detected by the shift detector 58 and the correction amount corrected by the image shooting system such that the positions of the detection target regions of the flash image data and the non-flash image data are substantially matched.

First, in step 1501, it is determined whether or not the camera shake correction is ON. When the determination in step 1501 is affirmative, then in step 1502, the correction amount of the camera shake correction is detected. In step 1503, the detection target region represented by the target region image data is moved in accordance with the difference between the shift amount and the correction amount of the camera shake correction, metering is performed to the shifted detection target region, and the processing is terminated.

On the other hand, when the determination in step 1501 is negative, then in step 1504, metering is performed to the detection target region of the flash image data without moving the detection target region, and the processing is terminated.

Figure 22:
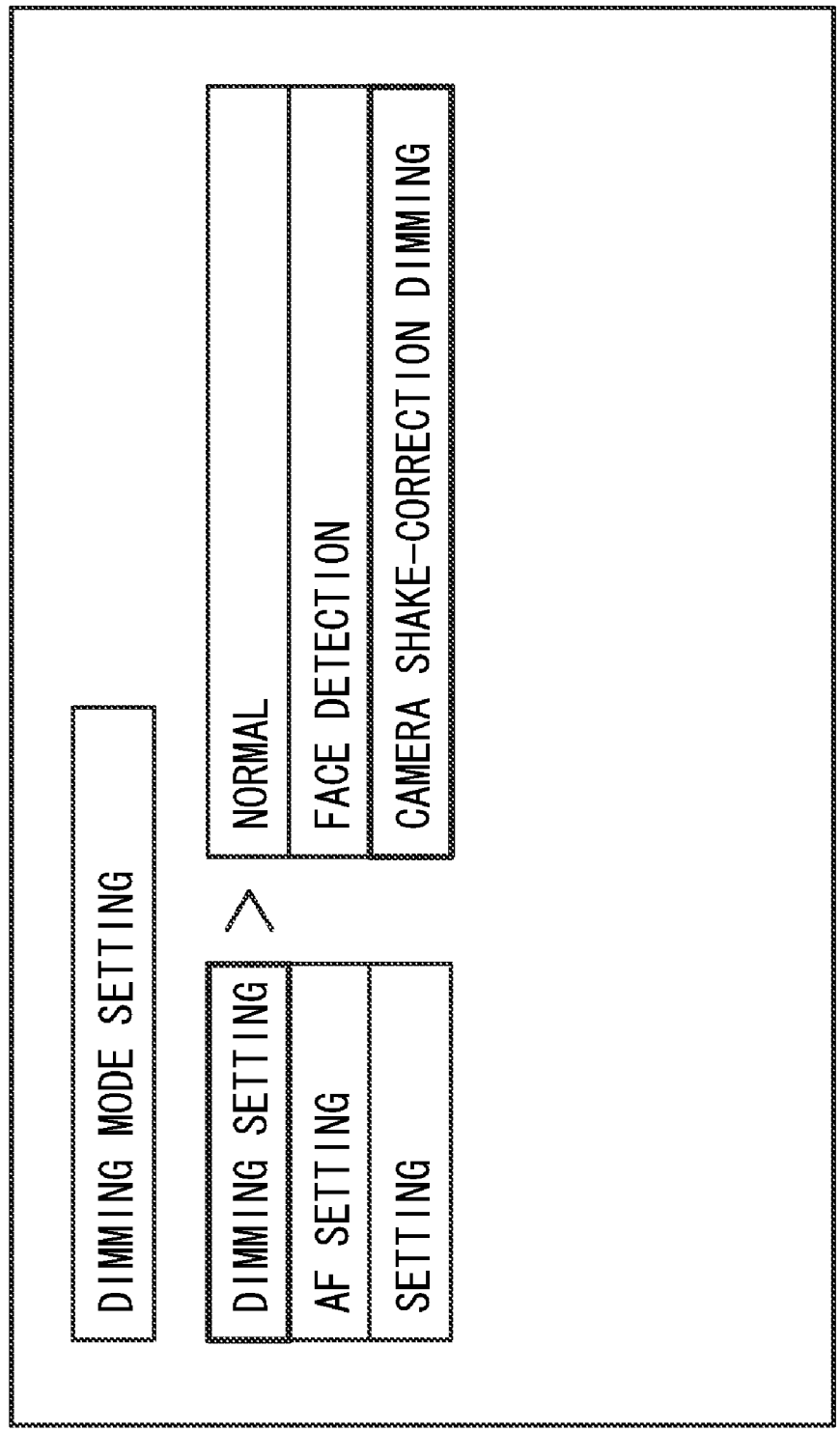
FIG. 22 is a diagram showing a setting screen.

The user may set plural dimming modes that include the camera shake-correction dimming that has been described above, using a screen such as that shown in FIG. 22, for example. As shown in FIG. 22, on this screen, three settings of "normal", "face detection" and "camera shake-correction dimming" are available as dimming mode settings.

Figure 23:
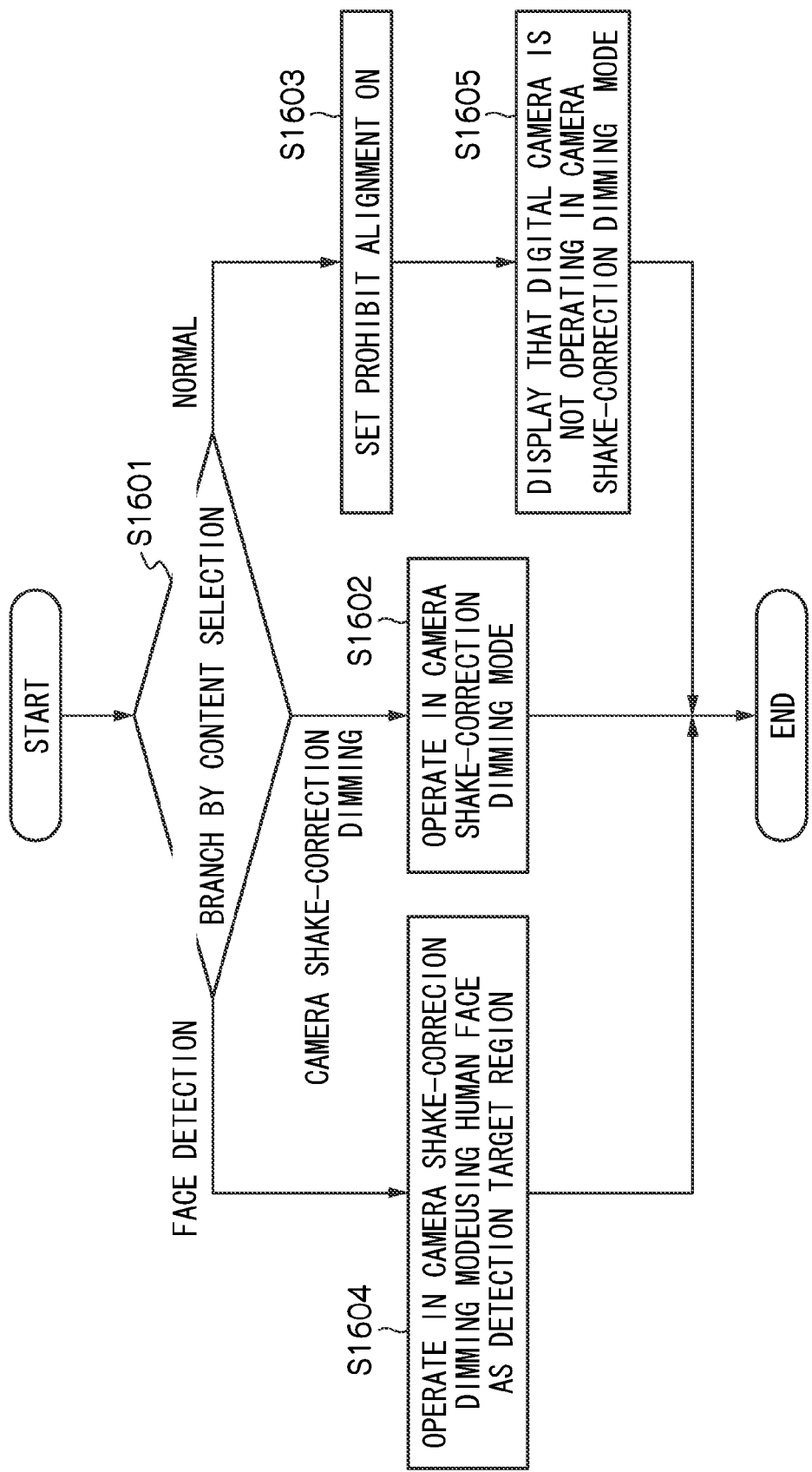
FIG. 23 is a flowchart showing a flow of processing during setting.

When a dimming mode has been set by a user using this screen, the processing shown in FIG. 23 is performed. First, in step 1601, the flow branches based on the dimming mode selected by the user. When "normal" is selected, then in step 1603 the alignment prohibition setting is set ON, and in step 1605, the fact that the camera shake-correction dimming is not performed (i.e., is inactive) is displayed, as a warning, on the LCD 38, and the processing is terminated. When "camera shake-correction dimming" is selected, then in step 1602, the digital camera 10 is set to a setting whereby camera shake-correction dimming is performed (i.e., is active) and the processing is terminated. On the other hand, in step 1601, when "face detection" is selected, then in step 1604, the digital camera 10 is set to a setting whereby the camera shake-correction dimming that uses a human face as the detection target region is performed and the processing is terminated.

The digital camera 10 may be configured to display, on the LCD 38, an icon indicating that the digital camera 10 is operating in the camera shake-correction dimming mode or an icon indicating that the digital camera 10 is not operating in the camera shake-correction dimming mode.

Figure 24:
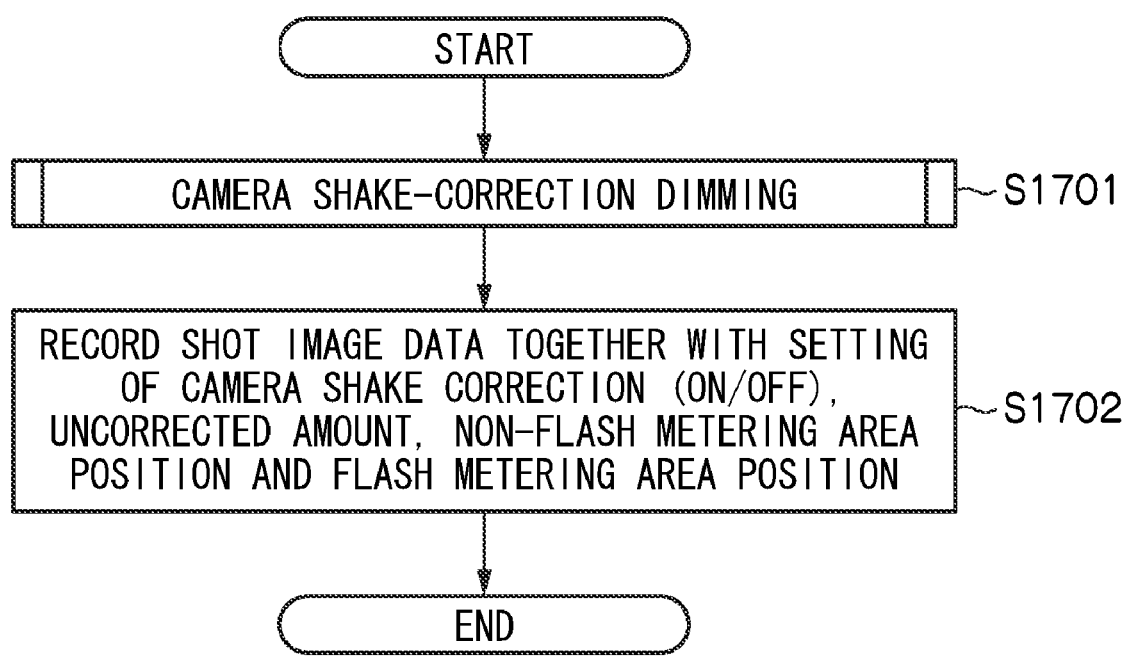
FIG. 24 is a flowchart showing a flow of processing for recording data relating to camera shake-correction dimming processing.

The image data that have been captured may be recorded after the camera shake-correction dimming described above has been performed. At this time, the digital camera 10 may also be configured to record data relating to the camera shake-correction dimming. This recording processing will be described using the flowchart of FIG. 24.

First, in step 1701, the camera shake-correction dimming is performed. In the next step 1702, the digital camera 10 records the image data that have been captured together with data items including: whether or not camera shake correction is ON, an "uncorrected amount", a non-flash metering area position (the detection target region during non-flash exposure) and a flash metering area position (the detection target region during flash exposure). The "uncorrected amount" represents the extent of correction that was not completed by the camera shake correction during the exposure stage, and the non-flash metering area position and the flash metering area position can respectively be represented by coordinates of one point of a rectangle including therein a subject, for example. Since the size of the rectangle (metering area) is constant, it suffices for only one point thereof to be determined. The data are recorded in the memory 48 in the configuration shown in FIG. 25. Further, the coordinates are position data that represent relative positions of a target region represented by target region image data of the non-flash image data and a target region represented by target region image data of the flash image data.

Using these data, adjustment of various kinds of parameters becomes possible when later performing image processing with respect to the image data that have been obtained by image shooting.

It will be noted that the flow of the processing of each flowchart described above constitutes one example thereof, it will be evident that the processing order can be changed, new steps can be added, and unnecessary steps can be omitted within a range that does not depart from the gist of the present invention.

As described above, according to the configuration of an aspect of the present invention, in an image shooting device that performs dimming using non-flash exposure and pre-flash exposure, dimming can be performed correctly even when the respective positions of a subject that is a target of dimming during non-flash exposure and a subject that is a target of dimming during pre-flash exposure have shifted because of camera shake.

In the preceding aspect, on the basis of the shift amount detected by the shift detector, the controller may move a position of the detection target region with respect to the subject position of one of the two sets of image data so as to substantially match that of the other of one of the two sets of image data.

According to this configuration, it becomes possible to reduce misalignment of the detection target regions between the non-flash image and the flash image.

In the preceding aspect, the detection target region may include plural sub-regions, and the brightness detector may detect a brightness level from each of plural sets of sub-region image data that correspond to the plural the sub-regions.

According to this configuration, the brightness level can be detected more precisely.

In the preceding aspect, the image shooting device may further include a face detector that detects, from the set of image data, a human face that is included in the subject, wherein the target region image data includes the detected human face.

According to this aspect, the brightness level can be detected from a human face, which frequently constitutes the main subject of an image to be captured.

In the preceding aspect, the image shooting component may further include a prohibiting component that prohibits correction of the detection target region by the controller when the image shooting component outputs a set of image data in which the shift of the subject position therein has been corrected on the basis of the shift amount detected by the shift detector.

According to this configuration, in a case in which the image shooting component is capable of outputting, in an exposure stage, image data that have been corrected for camera shake, the brightness level can be detected without performing any correction at a metering stage. Further, to this configuration, electrical power consumption can be reduced.

In the preceding aspect, when the image shooting component outputs a set of image data in which the shift of the subject position has been corrected by a correction amount that is within a predetermined range on the basis of the shift amount detected by the shift detector, the controller, on the basis of the shift amount detected by the shift detector and the correction amount of the image data corrected by the image shooting component, may correct at least one of two sets of image data including a set of image data acquired in a state in which the flash component is not emitting light or a set of image data acquired in a state in which the flash component is emitting light, such that positions of the detection target region with respect to the subject position of the respective sets of image data are substantially matched.

According to this configuration, an image shooting device that enables dimming to be performed correctly can be provided.

In the preceding aspect, the image shooting device may further include a display component; and a prohibition display controller that controls the display component to display the fact that the correction is being prohibited by the prohibiting component.

According to this configuration, the fact that the correction is being prohibited can be explicitly communicated to a user.

In the preceding aspect, the image shooting device may further include a recording component that records relative position data of the detection target region of the set of image data acquired in a state in which the flash component is not emitting light and the detection target region of the set of image data acquired in a state in which the flash component is emitting light.

According to this configuration, adjustment of various kinds of parameters becomes possible when later performing image processing with respect to the image data obtained by image shooting.

What is claimed is:

1. An image shooting device comprising:
  a flash component that emits light toward a subject;
  an image shooting component that outputs, for dimming, two sets of image data including non-flash image data that is obtained by shooting the subject without emitting light by the flash component, and flash image data that is obtained by shooting the subject with emitting light by the flash component, each of the sets of image data comprising target region image data that correspond to a detection target region that includes the subject;
  a shift detector that detects a shift amount, between subject positions in the non-flash image data and the flash image data, the shift amount indicating a shift that has arisen due to shaking of the image shooting device;
  a controller that, on the basis of the shift amount detected by the shift detector, corrects at least one of the non-flash image data or the flash image data, such that positions of the detection target region with respect to the subject position of the non-flash image data and the flash image data are substantially matched;

a brightness detector that detects brightness levels from the target region image data of the non-flash image data and the flash image data;

a flash amount determining component that determines a flash amount of the flash component on the basis of the detected brightness level of the non-flash image data and the flash image data; and further comprising a prohibiting component that prohibits correction of the detection target region by the controller when the image shooting component outputs the two sets of image data in which the shift of the subject position therein has been corrected on the basis of the shift amount detected by the shift detector.

2. The image shooting device of claim 1, wherein, on the basis of the shift amount detected by the shift detector, the controller moves a position of the detection target region with respect to the subject position of one of the two sets of image data so as to substantially match that of the other of one of the two sets of image data.

3. The image shooting device of claim 1, wherein the detection target region comprises a plurality of sub-regions, and the brightness detector detects a brightness level from each of a plurality of sets of sub-region image data that correspond to the plurality of the sub-regions.

4. The image shooting device of claim 1, further comprising a face detector that detects, from the set of image data, a human face that is included in the subject, wherein the target region image data includes the detected human face.

5. The image shooting device of claim 1, wherein when the image shooting component outputs the two sets of image data in which the shift of the subject position has been corrected by a correction amount that is within a predetermined range on the basis of the shift amount detected by the shift detector, the controller, on the basis of the shift amount detected by the shift detector and the correction amount of the image data corrected by the image shooting component, corrects at least one of the two sets of image data such that positions of the detection target region with respect to the subject position of the respective two sets of image data are substantially matched.

6. The image shooting device of claim 1, further comprising:

a display component; and a prohibition display controller that controls the display component to display the fact that the correction is being prohibited by the prohibiting component.

7. The image shooting device of claim 1, further comprising a recording component that records relative position data of the detection target region of the non-flash image data and the detection target region of the flash image data.

8. The image shooting device of claim 1, wherein the image shooting component outputs the two sets of image data in response to the image shooting device receiving a shooting instruction from a user.

9. The image shooting device of claim 1, wherein after the flash amount determining component determines the flash amount, the image shooting component outputs, for recording, an image data with emitting light by the flash component in accordance with the determined flash amount.

* * * * *